(12) United States Patent
Mordani et al.

(10) Patent No.: US 10,382,537 B2
(45) Date of Patent: Aug. 13, 2019

(54) SYSTEM AND METHOD FOR USE OF A GLOBAL RUNTIME IN A MULTITENANT APPLICATION SERVER ENVIRONMENT

(71) Applicant: ORACLE INTERNATIONAL CORPORATION, Redwood Shores, CA (US)

(72) Inventors: Rajiv Mordani, Sunnyvale, CA (US); Nazrul Islam, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 406 days.

(21) Appl. No.: 14/864,723

(22) Filed: Sep. 24, 2015

(65) Prior Publication Data

US 2016/0094647 A1 Mar. 31, 2016

Related U.S. Application Data

(60) Provisional application No. 62/055,575, filed on Sep. 25, 2014, provisional application No. 62/055,577,
(Continued)

(51) Int. Cl.
*G06F 15/16* (2006.01)
*H04L 29/08* (2006.01)
(Continued)

(52) U.S. Cl.
CPC ........ *H04L 67/1044* (2013.01); *G06F 9/5077* (2013.01); *G06F 16/213* (2019.01);
(Continued)

(58) Field of Classification Search
CPC ......... G06F 17/30471; G06F 17/30474; G06F 17/30566; G06F 17/30575;
(Continued)

(56) References Cited

U.S. PATENT DOCUMENTS 8,326,876 B1 12/2012 Venkataraman et al.
2012/0072597 A1 3/2012 Teather et al.
(Continued)

FOREIGN PATENT DOCUMENTS

CN 101639835 2/2010
CN 102170457 8/2011
(Continued)

OTHER PUBLICATIONS

International Search Report and Written Opinion for PCT/US2015/052459 dated Jan. 4, 2016.
(Continued)

*Primary Examiner* — Normin Abedin
(74) *Attorney, Agent, or Firm* — Tucker Ellis LLP

(57) ABSTRACT

In accordance with an embodiment, described herein is a system and method for providing an end-to-end lifecycle in a multi-tenant application server environment. A lifecycle manager enables configuration integration across different components, for example application servers, traffic directors or load balancers, and database or other components, which may have their own partition-specific configurations. In accordance with an embodiment, the end-to-end lifecycle infrastructure includes a plugin-based mechanism which enables the different components within a multi-tenant application server environment to use a lifecycle plugin to provide their own component-specific lifecycle functionality. In accordance with an embodiment, the system includes support for a tenant onboarding functionality, which can be used to onboard a tenant for a service to a particular partition. In accordance with an embodiment, the system supports the use of a global runtime within the multi-tenant application server environment.

20 Claims, 19 Drawing Sheets

Related U.S. Application Data filed on Sep. 25, 2014, provisional application No. 62/055,856, filed on Sep. 26, 2014, provisional application No. 62/056,427, filed on Sep. 26, 2014.

(51) Int. Cl.
*H04L 12/911* (2013.01)
*G06F 9/50* (2006.01)
*G06F 16/21* (2019.01)

(52) U.S. Cl.
CPC ............ *G06F 16/217* (2019.01); *H04L 47/70* (2013.01); *H04L 67/1002* (2013.01); *H04L 67/1097* (2013.01)

(58) Field of Classification Search
CPC ......... G06F 17/30578; G06F 17/30584; H04L 47/76; H04L 67/02; H04L 67/10; H04L 67/2819; H04L 67/42; H04L 69/40
See application file for complete search history.

(56) References Cited

U.S. PATENT DOCUMENTS

| | | | |
|---|---|---|---|
| 2014/0075565 A1* | 3/2014 | Srinivasan | G06Q 10/06315 726/26 |
| 2014/0280975 A1 | 9/2014 | Mordani et al. | |
| 2015/0207758 A1 | 7/2015 | Mordani et al. | |
| 2015/0296030 A1* | 10/2015 | Maes | G06F 9/5072 715/736 |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0142506 A1 | 5/2016 | Sahoo et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |
| JP | 2014096675 | 5/2014 |
| JP | 2014524608 | 9/2014 |
| WO | 2012063301 | 5/2012 |
| WO | 2014039892 A1 | 3/2014 |
| WO | 2014039918 A1 | 3/2014 |
| WO | 2014039919 A1 | 3/2014 |

OTHER PUBLICATIONS

Chinese Patent Office, Office Action for Chinese Application No. 201580003512.6 dated Jul. 20, 2018, 8 pages.

Japanese Office Action for Japanese Patent Application No. 2017-516339, dated Jun. 4, 2019, 5 pages.

English Translation of Japanese Office Action for Japanese Patent Application No. 2017-516339, dated Jun. 4, 2019, prepared Jun. 10, 2019, 7 pages.

* cited by examiner

SYSTEM AND METHOD FOR USE OF A GLOBAL RUNTIME IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Applications "SYSTEM AND METHOD FOR PROVIDING END-TO-END LIFECYCLE IN A MULTI-TENANT APPLICATION SERVER ENVIRONMENT" Application No. 62/055,575, filed Sep. 25, 2014; "SYSTEM AND METHOD FOR TENANT ONBOARDING IN A MULTITENANT APPLICATION SERVER ENVIRONMENT", Application No. 62/055,577, filed Sep. 25, 2014; "SYSTEM AND METHOD FOR DATABASE AND APPLICATION SERVER LIFECYCLE PLUGINS IN A MULTITENANT APPLICATION SERVER ENVIRONMENT", Application No. 62/055,856, filed Sep. 26, 2014; and "SYSTEM AND METHOD FOR GLOBAL RUNTIME IN A MULTITENANT APPLICATION SERVER ENVIRONMENT", Application No. 62/056,427, filed Sep. 26, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to systems and methods for providing an end-to-end lifecycle, tenant onboarding, or global runtime, in a multitenant application server environment.

BACKGROUND

Application servers generally provide a managed computing environment within which software applications can be deployed and run. Cloud-based computing environments allow applications to run within and take advantage of the distributed resources provided by a cloud. Such environments can support large numbers of users or tenants, some of which may have specific requirements that are particular to that user or tenant. When additional tenants are added to the system, the system must be able to address each tenant's needs, including associating other system components with the tenant as necessary. These are some examples of the type of environments in which embodiments of the present invention can be used.

SUMMARY

In accordance with an embodiment, described herein is a system and method for providing an end-to-end lifecycle in a multi-tenant application server environment. A lifecycle manager enables configuration integration across different components, for example application servers, traffic directors or load balancers, and database or other components, which may have their own partition-specific configurations. In accordance with an embodiment, the end-to-end lifecycle infrastructure includes a plugin-based mechanism which enables the different components within a multi-tenant application server environment to use a lifecycle plugin to provide their own component-specific lifecycle functionality. In accordance with an embodiment, the system includes support for a tenant onboarding functionality, which can be used to onboard a tenant for a service to a particular partition. In accordance with an embodiment, the system supports the use of a global runtime within the multi-tenant application server environment.

DETAILED DESCRIPTION

In accordance with an embodiment, described herein is a system and method for providing an end-to-end lifecycle in a multi-tenant application server environment. A lifecycle manager enables configuration integration across different components, for example application servers, traffic directors or load balancers, and database or other components, which may have their own partition-specific configurations.

In accordance with an embodiment, the end-to-end lifecycle infrastructure includes a plugin-based mechanism which enables the different components within a multi-tenant application server environment to use a lifecycle plugin to provide their own component-specific lifecycle functionality.

In accordance with an embodiment, the system includes support for a tenant onboarding functionality, which can be used to onboard a tenant for a service to a particular partition.

In accordance with an embodiment, the system supports the use of a global runtime within the multi-tenant application server environment.

Application Server (e.g., Multi-Tenant, MT) Environment

Figure 1:
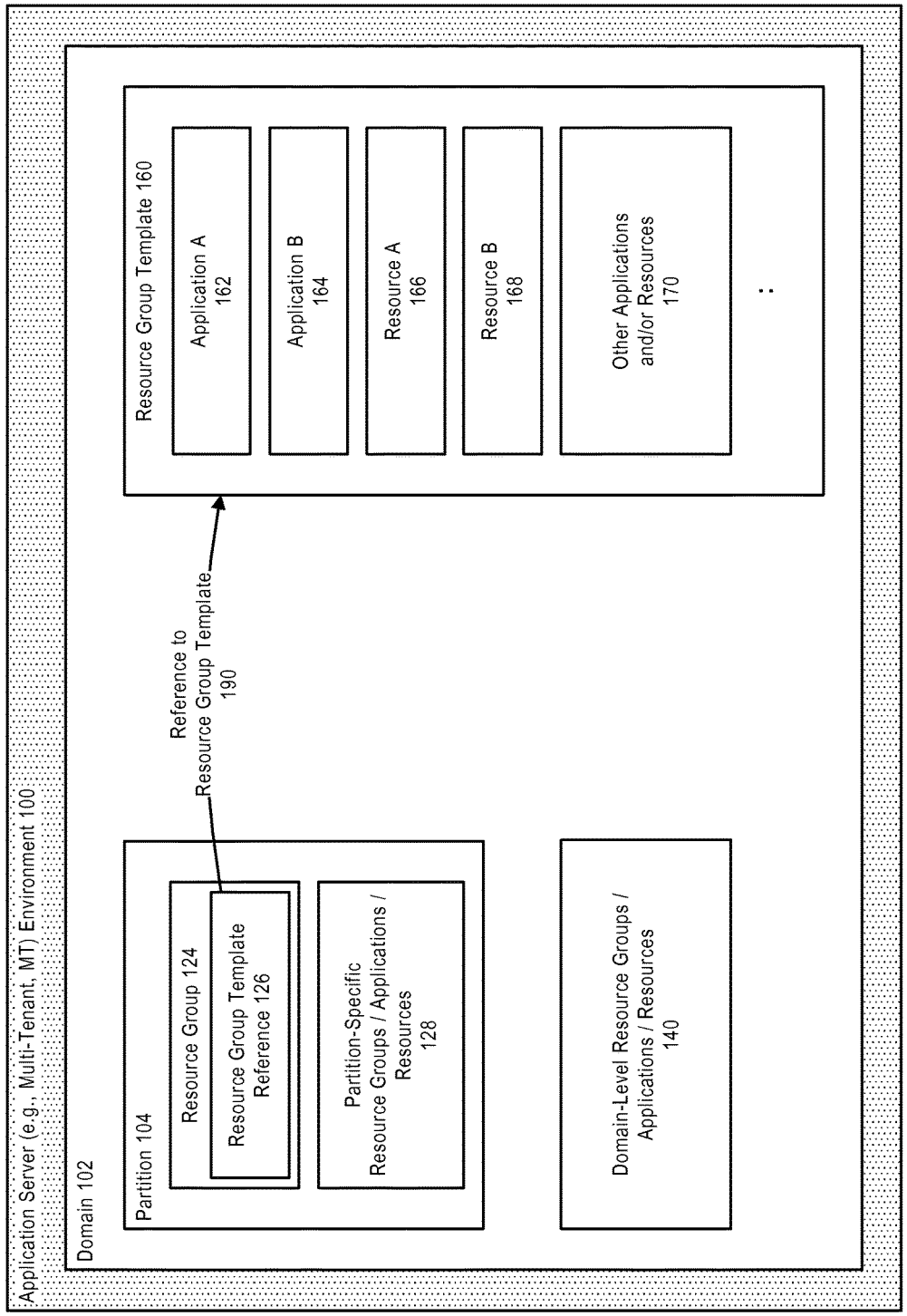
FIG. 1 illustrates a multitenant application server environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
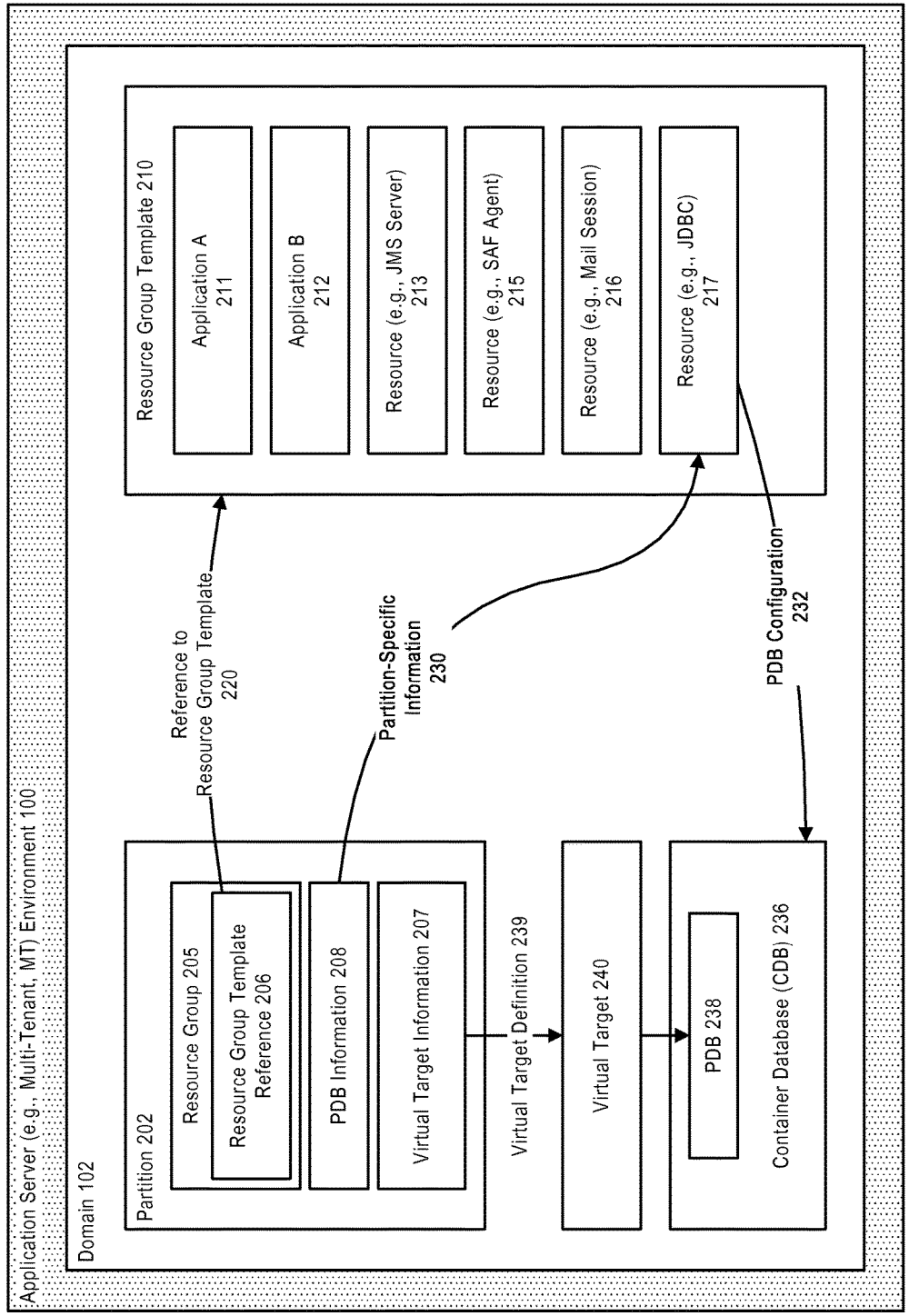
FIG. 2 further illustrates a multitenant application server environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
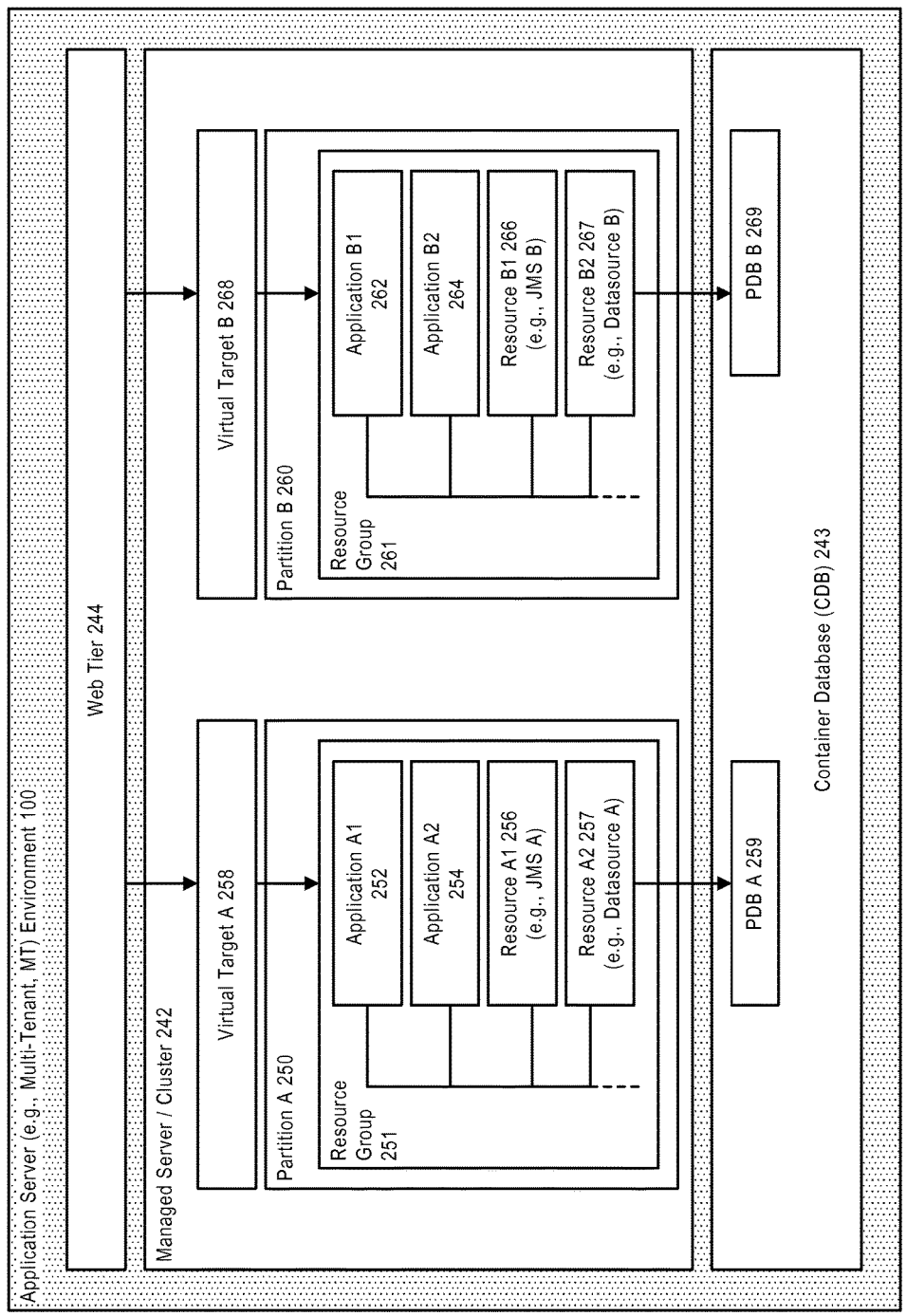
FIG. 3 further illustrates a multitenant application server environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
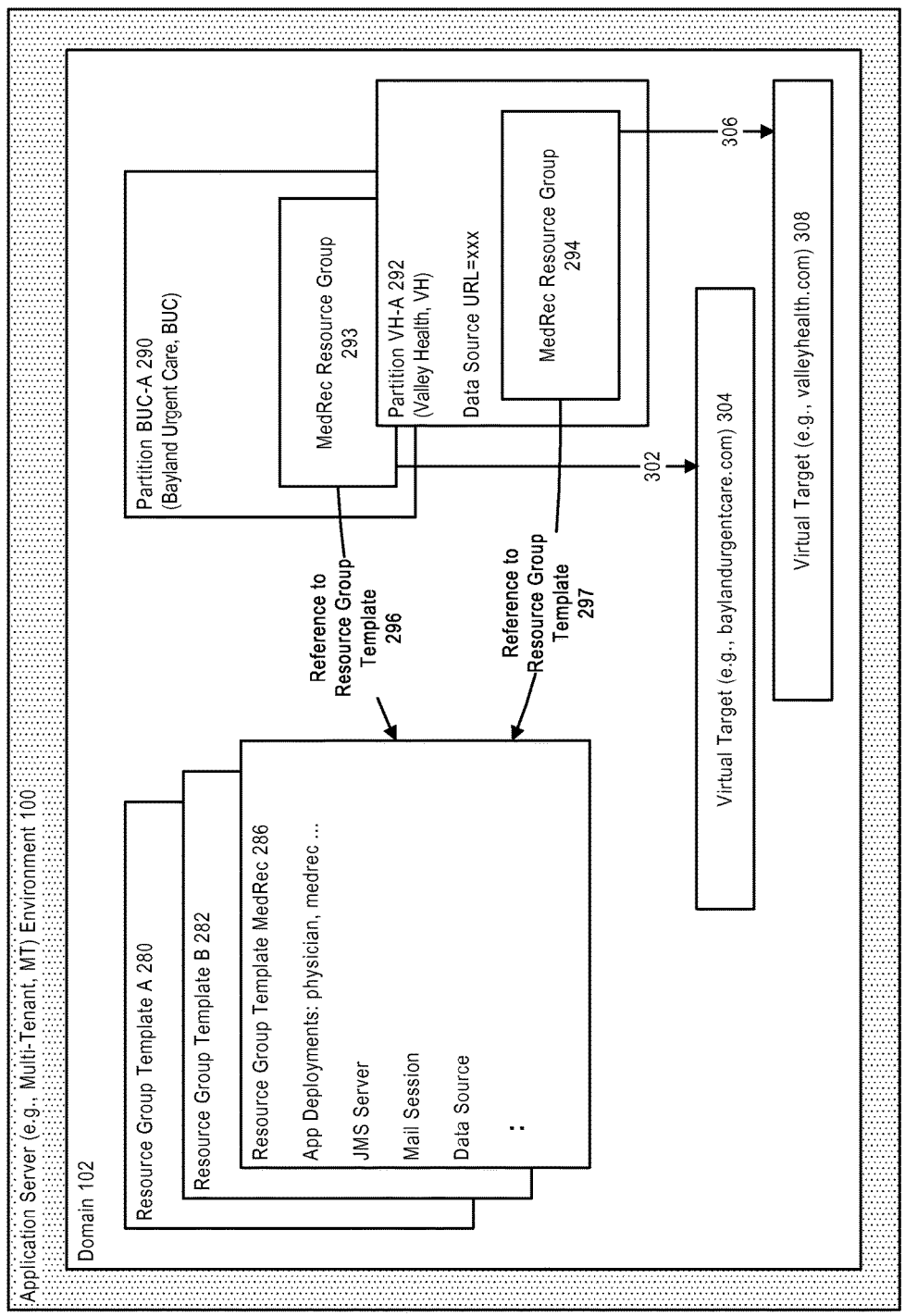
FIG. 4 further illustrates a multitenant application server environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
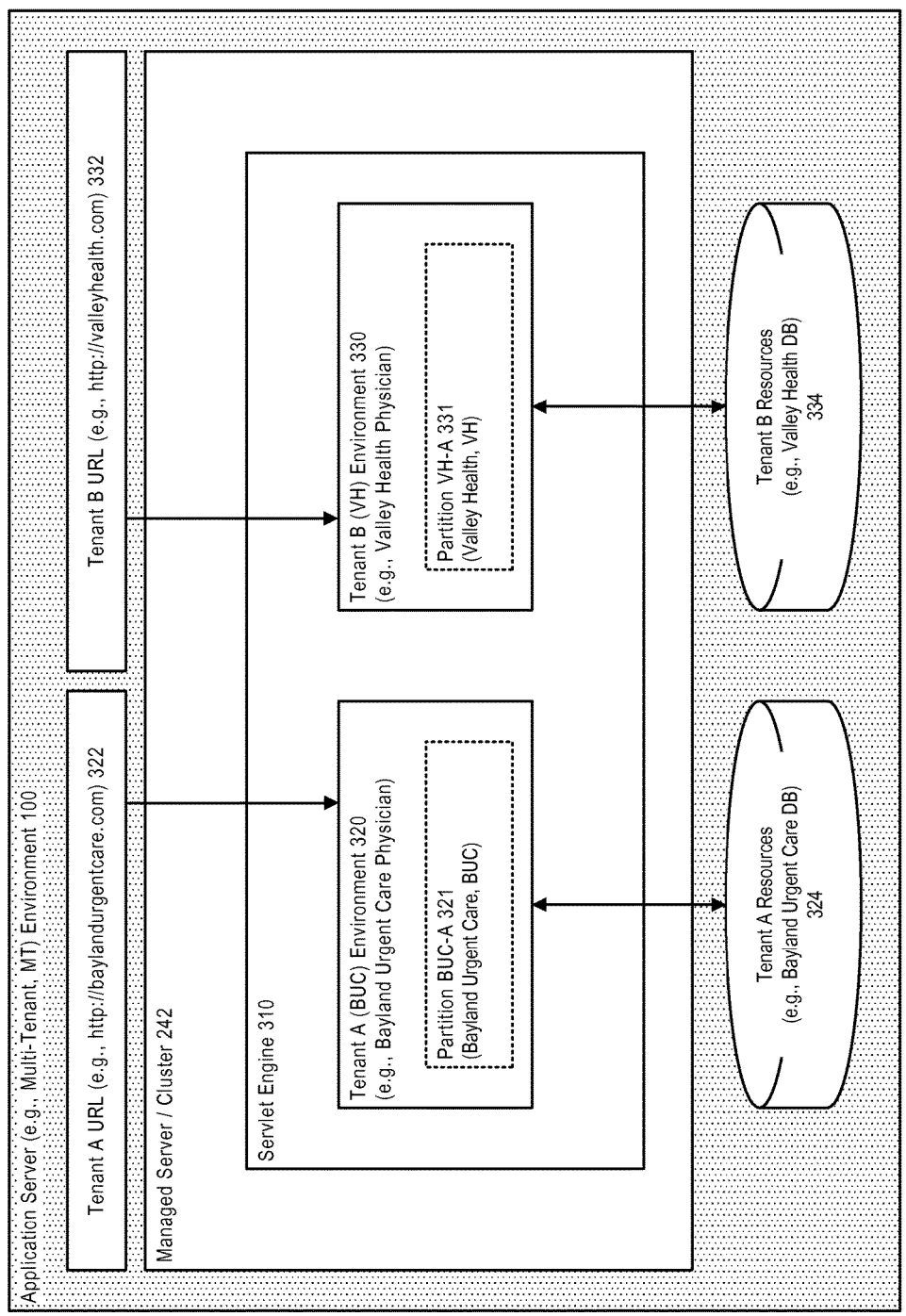
FIG. 5 further illustrates a multitenant application server environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

End-to-End Lifecycle

In accordance with an embodiment, described herein is a system and method for providing an end-to-end lifecycle in a multi-tenant application server environment. A lifecycle manager enables configuration integration across different components, for example application servers, traffic directors or load balancers, and database or other components, which may have their own partition-specific configurations.

In accordance with various embodiments, some of the descriptions of the end-to-end lifecycle process that are provided herein use the following terms:

Tenancy: a right to use a component of the system, typically obtained for a limited duration by a tenant, to allow that tenant to customize the behavior of the system to a certain extent to suit their needs.

Tenancy context: contextual information, for example security, naming, or class loading information, which is used to determine the tenancy of a system, so that the system can then use that tenancy context to provide tenant-specific behavior, such as generating bills.

Partition context: a partition identifier (ID) associated with a current thread of execution, which the system can use to determine platform tenancy.

Resource tenancy: a similar property as "tenancy", used primarily when describing Oracle Fusion Middleware (FMW)/Fusion Application (FA) embodiments.

MT admin code: code that is deployed and activated before any tenant is onboarded for a multi-tenant system, and which is responsible for lifecycle management of the system as well as tenant runtimes.

MT admin runtime: a runtime representation of the MT admin code.

Tenant code: code that is specifically deployed for a tenant.

Tenant runtime: a runtime representation of the tenant code.

Layered products: software products which can interoperate with or otherwise utilize a multi-tenant application server environment, examples of which can include the FMW and FA families of products.

Figure 6:
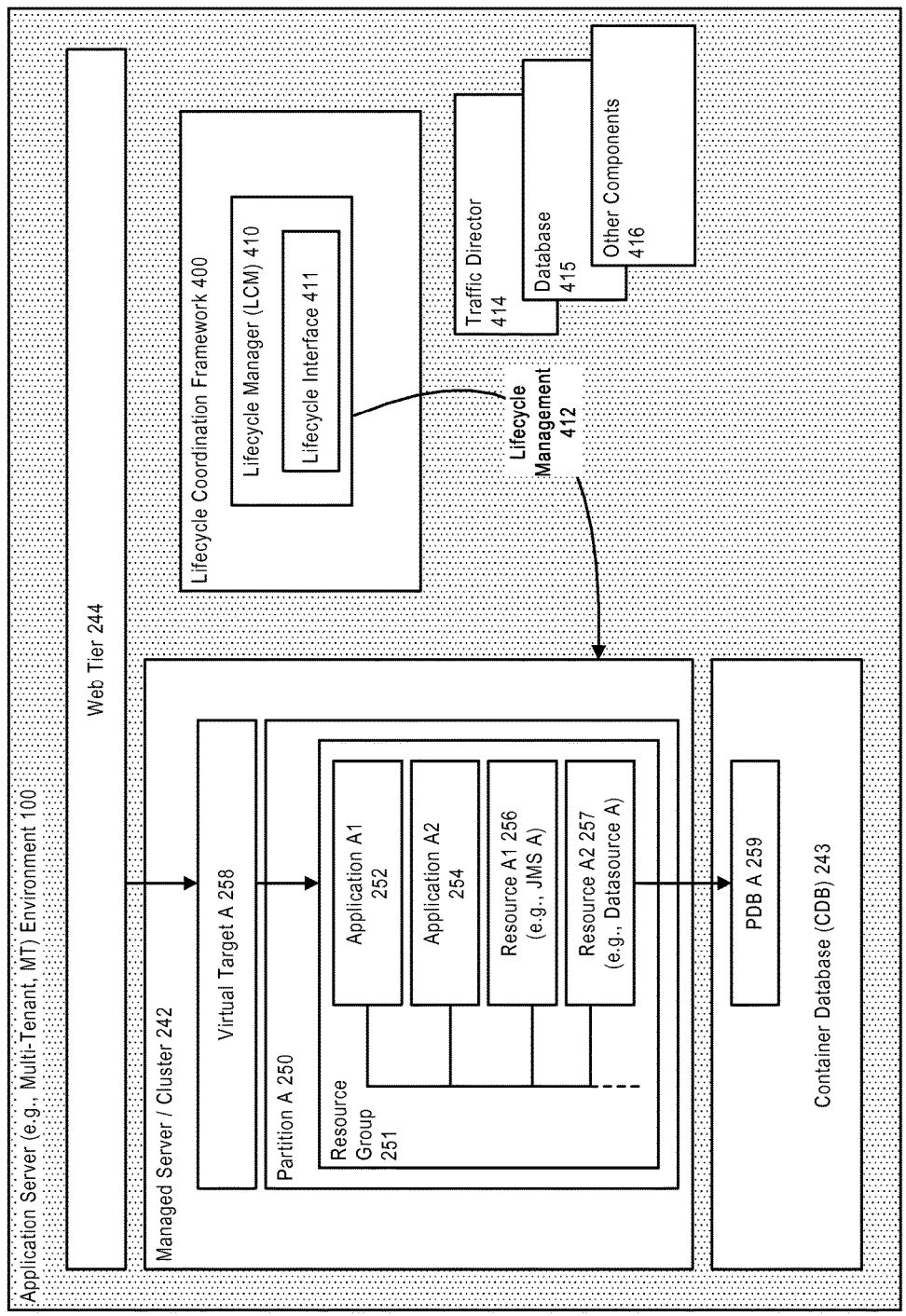
FIG. 6 illustrates an end-to-end lifecycle in a multitenant application server environment, in accordance with an embodiment.

FIG. 6 illustrates an end-to-end lifecycle in a multitenant application server environment, in accordance with an embodiment.

As illustrated in FIG. 6, in accordance with an embodiment, the system can include a lifecycle coordination framework 400, including a lifecycle manager (LCM) 410 and lifecycle interface 411, which enables lifecycle management 412 of partition and other components, for example a traffic director component 414, database component 415, or other types of components 416, for use within the multitenant application server environment.

For example, in addition to enabling an application server (e.g., a WebLogic, WLS) component to be multitenant-aware, and to support the use of partitions within the application server, the system must be able to ensure that other components and products can interoperate with the application server partitions, for example that database (e.g., Oracle Database, DB), and traffic director or load balancer (e.g., Oracle Traffic Director, OTD) instances can be properly configured and can thereafter similarly support those partitions.

To address this, in accordance with an embodiment, as part of creating a partition for use with an application server, then, in addition to creating the application server partition, the system allows creation of a slice of runtime in other components that will ultimately be wired up with the application server partition. The result is a system in which an application can be entirely run within its own environment from, e.g., an OTD layer, down to a database layer.

In accordance with an embodiment, the end-to-end lifecycle infrastructure includes a plugin-based mechanism which enables a plurality of different components within a multi-tenant application server environment to use a lifecycle plugin to provide their own component-specific lifecycle functionality. Any component which will be made available to be wired up with a partition can provide its own plugin. Lifecycle operations can then call the plugin interface, which in turn performs the actual creation of the component—for example, the creation of a traffic director instance, or the creation of a database instance, as appropriate.

In accordance with an embodiment, in addition to creating application server and/or component partitions, each tenant can be associated with an environment, as further described below, wherein the environment acts as a container or container object within which the tenant of a partition can run their own applications.

For example, in accordance with an embodiment, the lifecycle manager and its pluggable extensible mechanism can be used to support the creation of components within the middleware or database stack, and to also support the wiring of those components, such as wiring up an application server (e.g., WLS) partition to use a datasource. The collection of wired components can then be provided within a partition or tenant environment.

As another example, in accordance with an embodiment, the system can enable an application server partition to be associated with a database, and created during a lifecycle, which then creates a datasource in the application server partition and makes it usable within a partition or tenant environment.

Similarly, in accordance with an embodiment, the lifecycle manager can be used to set up OTD routing for a partition, including setting up a URI or host name for use with the partition, such that a WLS partition running in a cluster is front-ended with an OTD instance, while the lifecycle manager enables the creation of an OTD instance for the partition, and its wiring to the WLS partition, for use within a tenant environment.

Additional advantages provided by the end-to-end lifecycle management include the ability to detect changes out-of-band.

For example, an update to an application server partition can be sent to other components that are wired to that partition. As another example, when a new resource group is associated with a new target, that updated information can be sent to other layered products, such that the changes in the partition are propagated to any other wired components.

In accordance with an embodiment, orchestration of the lifecycle can be performed in a variety of ways to create the various components or slices of runtime. For example, the system can individually create a partition, PDB, and OTD instance as REST calls to the lifecycle manager, which directs the lifecycle manager to, e.g., create a WLS partition, and create an OTD instance, or other slices of components.

During orchestration, if a failure occurs, the system can accommodate it by, for example, retrying the REST endpoint for association and orchestration of its artifacts.

Exemplary end-to-end lifecycle use cases include providing a lifecycle manager on an admin server within a cluster, and/or other lifecycle managers on managed servers within the cluster. For example, in a single domain, a single lifecycle manager can be provided on the admin server. For multiple domains, or high-availability requirement models, in which a lifecycle manager can manage, e.g., multiple OTD instances on multiple servers, the lifecycle manager can be run within a cluster of its own front-ended by a load balancer, and from that domain the lifecycle manager can manage multiple runtimes.

In accordance with an embodiment, the end-to-end lifecycle configuration information can be saved, for example to an XML file in a single domain mode, or more typically to a database in a high-availability mode.

In accordance with an embodiment, the lifecycle manager can recognize that it is operating on behalf of a particular partition by, in response to receiving a call, e.g., via REST, for use with a registered runtime, determining from the call details an intended partition, and, based on what that call is attempting to create, calling one or more appropriate plugins.

For example, if the call is directed to creating a PDB for a partition, then the lifecycle manager can respond by calling the database lifecycle plugin; or if the call is directed to creating an OTD instance for a partition, then the lifecycle manager can respond by calling the OTD lifecycle plugin, and so on.

In a single domain multiple partition environment, when an admin server fails, which had been providing lifecycle manager functionality, the system can continue to act as a traditional application server (e.g., WLS) server environment would, although it's administrative and management functionality may be disabled for a period of time.

In accordance with an embodiment, the system can use HK2 as a dependency injection mechanism, for looking up contracts and implementations of those contracts as services. For example, using HK2, services can be injectable into components, and, once injected, their HK2 objects can satisfy the dependencies of other classes. Lifecycle plugins can be implemented as HK2 services and implement their contract at runtime. The system can look up a contract to find appropriate plugins that have been plugged in as services.

For example, in accordance with an embodiment, the system can recognize a partition plugin contract, or a runtime plugin, or other contract. Each partition or other plugin can be configured with an understanding of how to operate to create a partition or slice of partition within that component, so for example, a database partition plugin can be configured with an understanding of how to operate to create a slice of a database.

In accordance with an embodiment, the system can receive an indication as to the type of service required during a call (e.g., "type=database"), and then determine an appropriate, in this case, database plugin to be used.

Similarly, in accordance with an embodiment, for application server (e.g., WLS) and traffic director (e.g., OTD) components, plugins can be provided for those components that can be implemented as services, and subsequently used during creation or configuration of a partition.

Mechanisms such as HK2 also provide support for configuration management which can be used to define a configuration model stored in XML by, for example, default store or persistence type.

In accordance with an embodiment, configuration objects can be used to define the attributes for a particular component for use with a partition. These objects are similarly injectable, which allows looking up configuration information of a given partition by, for example, injecting the configuration object and looking up the information for that partition.

Environment

In accordance with an embodiment, a set of partitions across different components can be linked together as an environment, to form a cohesive unit that serves a tenant's needs. While an environment can have more than one partition of each type, typically they will only have one of each type of partition. For example, in an FA scenario there can be more than one WLS partition from each of the domains in the multidomain topology; in such a scenario there can be multiple associations between WLS and OTD and Database that must be supported.

Component/Runtime

In accordance with an embodiment, a component or runtime is a software component, for example an OTD, WLS, Coherence, or Database component. In accordance with other embodiments, additional types of software components can also be supported.

Lifecycle Manager

In accordance with an embodiment, the lifecycle manager enables configuration integration across different components, for example application servers, traffic directors or load balancers, and database or other components, which may have their own partition-specific configurations. The lifecycle manager can be implemented as a library providing a local API and/or REST access to clients to create lifecycle configurations, update those configurations, view those configurations, and destroy those configurations across an environment.

Lifecycle Plugin

In accordance with an embodiment, a lifecycle plugin is a software module that provides a bridge between the lifecycle manager and a component, for example an OTD, WLS, Coherence, or Database component. Lifecycle plugins can include classes that implement the runtime plugin and partition plugin (where supported) interfaces as HK2 services, which enable the lifecycle plugin to participate in configuration change transaction and notification events and take whatever action is appropriate to reflect that activity in a component. The plugin API is generally agnostic of the underlying protocol used to perform the actual lifecycle operations for a runtime or a partition. The implementation of the plugin can choose how to connect to the runtime to perform the necessary operations. For example, in accordance with an embodiment, when an operation is initiated on a runtime via the runtime manager, such as quiesce, scaleUp or scaleDown, an implementation of the runtime plugin corresponding to the runtime type can be looked up via HK2, and the corresponding method of the runtime plugin (e.g., RuntimePlugin) implementation invoked for the runtime plugin to take appropriate action.

Client

In accordance with an embodiment, a client refers to any client of a lifecycle manager, which interacts with the lifecycle manager via, e.g., REST APIs or in an embedded case via Java APIs. Examples of clients include Oracle Fusion Middleware Control (FMWC) and Enterprise Manager Cloud Control (EMCC), and curl-based scripts. In accordance with an embodiment, the lifecycle manager REST APIs can be used within products such as Enterprise Manager when provisioning and updating partition configurations across components.

Lifecycle Use Cases

In accordance with an embodiment, the following are examples of lifecycle use cases: 1. Partition CRUD operations for a component, including the creation, deletion and updates of a partition; 2. Runtime operations for a component, including registration of runtimes, updates to the registered runtimes and unregistration of runtimes; and 3. Association of partitions across different components, so that associating two partitions wires the two slices of runtimes (for example, a Database with WLS, or an OTD with WLS), so that the two can be used together.

Lifecycle Interactions

Figure 7:
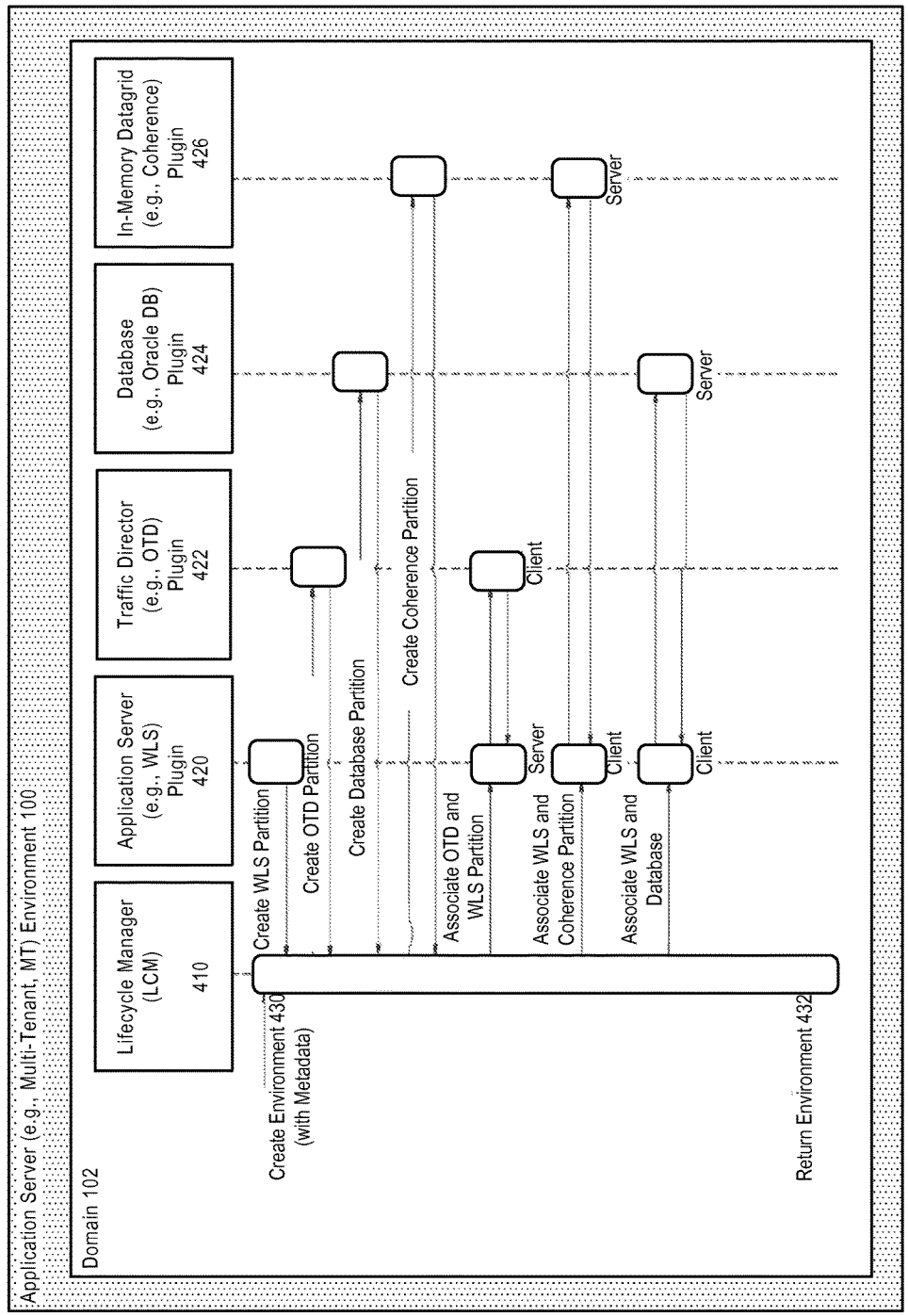
FIG. 7 illustrates an end-to-end lifecycle event diagram in a multitenant application server environment, in accordance with an embodiment.

FIG. 7 illustrates an end-to-end lifecycle event diagram in a multitenant application server environment, in accordance with an embodiment.

As illustrated in FIG. 7, in accordance with an embodiment, the lifecycle manager can allow orchestration of components associated with one or a plurality of plugins, such as an application server (e.g., WLS) lifecycle plugin 420, a traffic director (e.g., OTD) lifecycle plugin 422, a database (e.g., Oracle Database) lifecycle plugin 424, and/or an in-memory data grid (e.g., Coherence) lifecycle plugin 426.

In accordance with an embodiment, in response to receiving a request to create an environment 430 (together with any associated metadata), the lifecycle manager orchestrates the creation and association of the various component partitions, and returns the environment 432, for the tenant to use thereafter.

Figure 8:
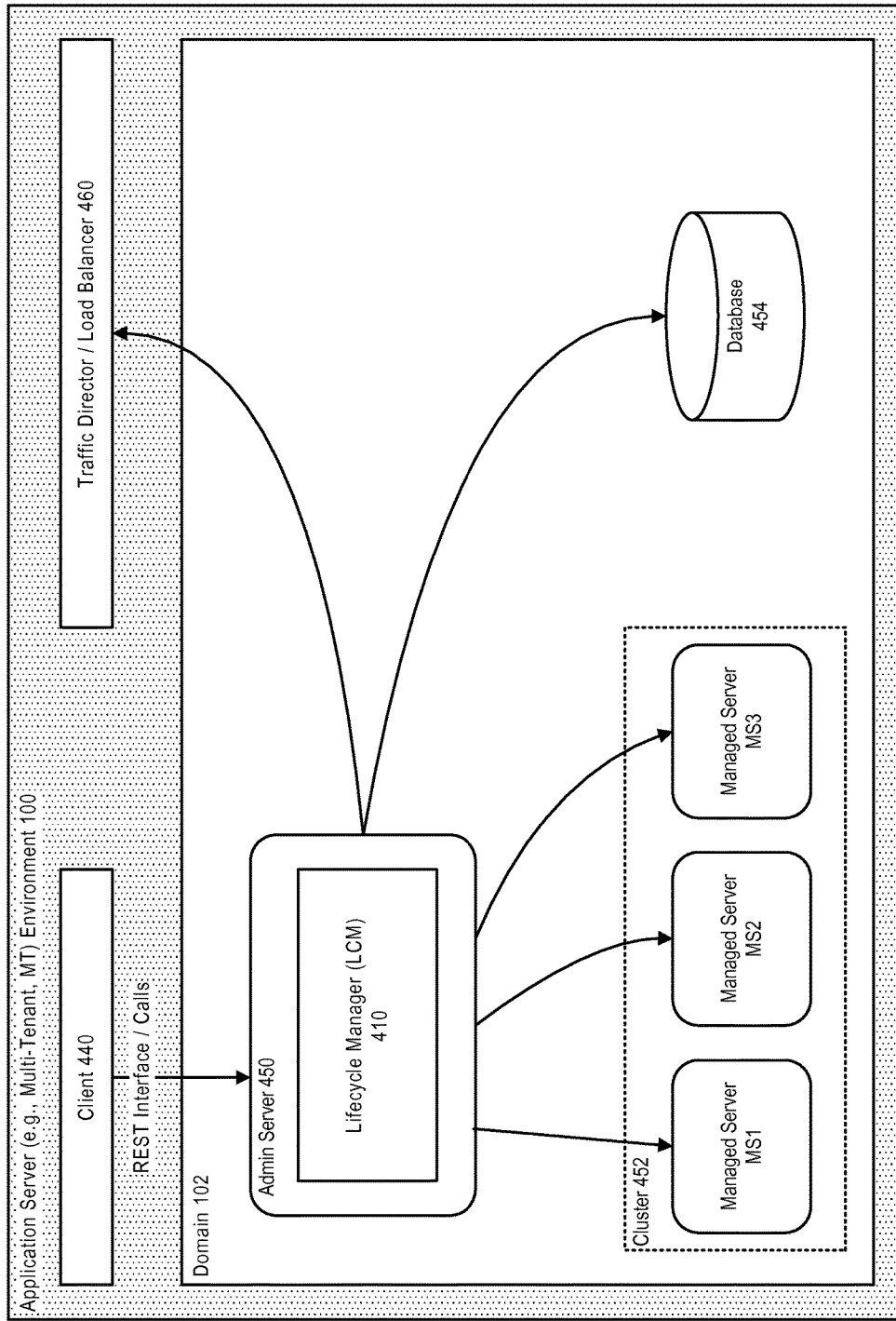
FIG. 8 illustrates an end-to-end lifecycle topology in a multitenant application server environment, in accordance with an embodiment.

FIG. 8 illustrates an end-to-end lifecycle topology in a multitenant application server environment, in accordance with an embodiment.

As illustrated in FIG. 8, in accordance with an embodiment, a simple or single domain usage can include one or more clients 440, an admin server 450, a cluster of managed servers 452 (here indicated as MS1, MS2 and MS3), a database 454, and a traffic director/load balancer 460, wherein the lifecycle manager is running in the domain it manages, along with the other components such as OTD, Database and Coherence.

In this scenario, the end-to-end lifecycle configuration can be stored in an XML file and is made available on the managed servers to establish the tenancy at runtime. The lifecycle manager can be enabled out-of-the-box in some application server environments, where it will be running on the admin server and will not require any additional setup.

Figure 9:
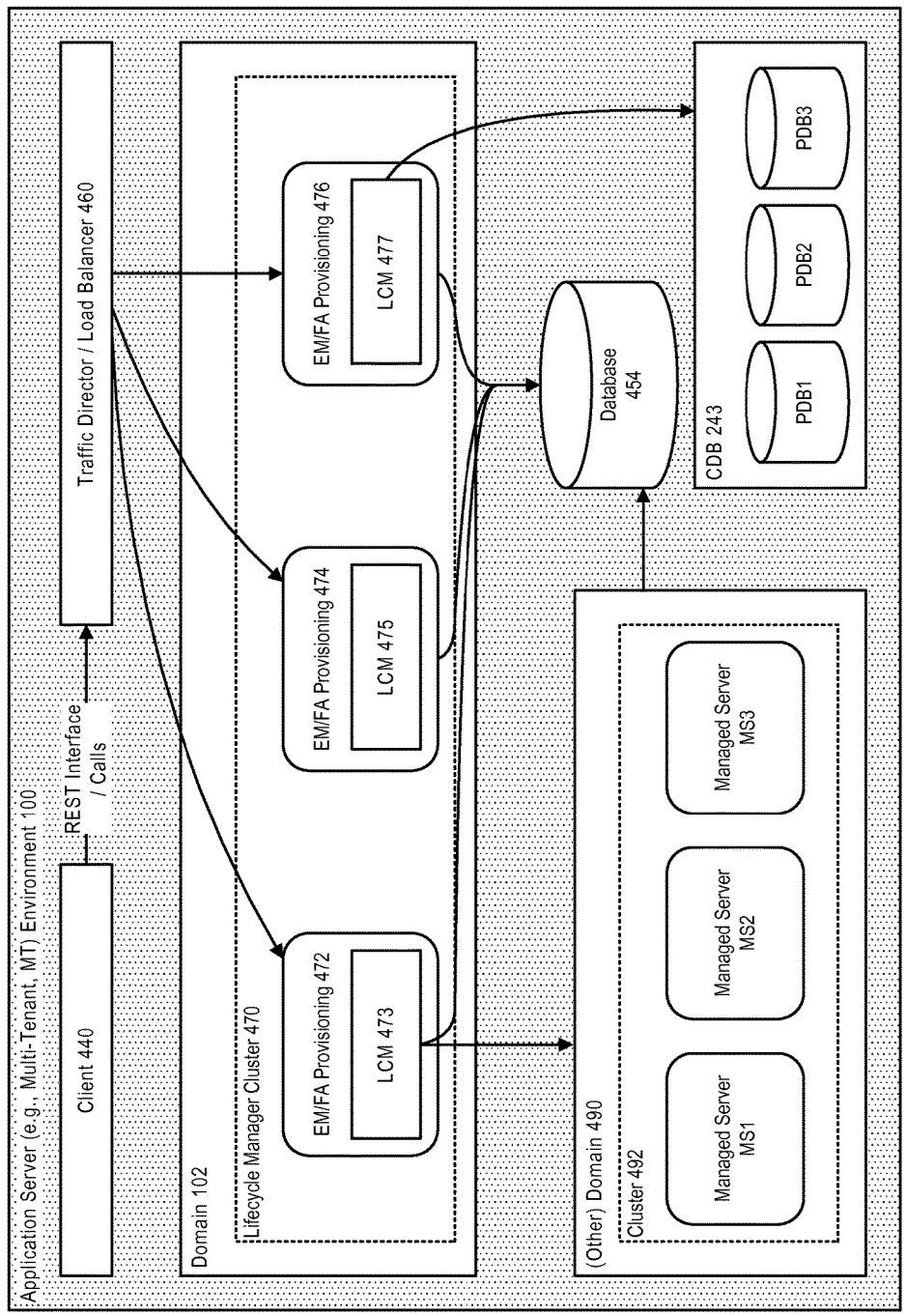
FIG. 9 illustrates another end-to-end lifecycle topology in a multitenant application server environment, in accordance with an embodiment.

FIG. 9 illustrates another end-to-end lifecycle topology in a multitenant application server environment, in accordance with an embodiment.

As illustrated in FIG. 9, in accordance with an embodiment and a more complex scenario, such as FA provisioning using Enterprise Manager (EM) in an enterprise deployment, wherein the lifecycle manager may be managing a lot of components and may also have high-availability requirements, the lifecycle manager can run in a separate lifecycle manager cluster/domain 471, as a plurality of EM/FA provisioning instances 472, 474, 476, each having lifecycle manager functionality 473, 475, 477.

In accordance with an embodiment, the lifecycle manager domain can be used to manage other domains or components, such as domain 490 having a cluster 492 of managed servers (here indicated as MS1, MS2 and MS3).

In this scenario, the lifecycle manager can run on the managed servers in the lifecycle manager cluster, and the end-to-end lifecycle configuration can be persisted in the database, so that any domains or runtimes that need access to the information can access the database to obtain that information.

In both of the above topologies, the components that can be managed within the lifecycle will be determined by the lifecycle plugins that are registered with the lifecycle manager, which in addition to configuration and creation can also support an elasticity functionality for scaling of runtimes as appropriate.

Lifecycle Runtime

In accordance with an embodiment, a lifecycle runtime (e.g., LifecycleRuntime) represents a component or managed service such as WLS, OTD, or Database. A lifecycle runtime can be managed by the lifecycle manager if an instance of the runtime plugin is implemented by the component. The runtime plugin provides implementations that allow operations such as creation, deletion, update, scaling up, scale down and quiescing operations that can be performed on the runtime that is being managed via lifecycle manager. A runtime can either be created via the lifecycle manager, or can be registered with the lifecycle manager if created out of band for use by the lifecycle manager via a register runtime (e.g., registerRuntime) method in the runtime manager.

In order to perform any operations on a runtime, an instance of the runtime must be looked up. In accordance with an embodiment, an instance of a lifecycle runtime can be looked up using a runtime manager for the given runtime type as described below. A lifecycle runtime that represents managed services that support the use of a partition (a slice of the runtime) allow CRUD operations for that partition on the lifecycle runtime.

In accordance with an embodiment, in order to create a partition after looking up a lifecycle runtime, a create partition (e.g., createPartition) method of the lifecycle runtime can be used to create a partition on the selected runtime. The way the partition is created is that the partition plugin for the lifecycle runtime will be looked up as a HK2 service for the runtime type, and the corresponding create method on the partition plugin is invoked.

Runtime Manager

In accordance with an embodiment, a runtime manager (e.g., RuntimeManager) can be provided as a singleton HK2 service that is used to manage runtimes. A runtime manager can be provided per Java virtual machine (JVM) that will manage the lifecycle of all runtimes on that JVM. Using a runtime manager, a runtime can be created or registered. The runtime manager also provides operations to create, delete, update, scaleUp, scaleDown and quiescing of a runtime. The runtime manager will look up the runtime plugin as a HK2 service for that runtime type and invoke the corresponding operation on the plugin.

In accordance with an embodiment, once a runtime manager is looked up for a given runtime type, then scaleUp and scaleDown operations on that runtime manager can be called for the specified runtime. The runtime manager will look up the corresponding runtime plugin for the service and invoke the scaleUp or scaleDown operation. This runtime support is particularly useful in addressing elasticity use cases.

In accordance with an embodiment, the runtime manager provides the following operations for use with runtimes:

| Operation | Description |
| --- | --- |
| createRuntime | Runtime can be created if the runtime plugin for the component supports creating the runtime. |
| deleteRuntime | Runtime can be deleted if the runtime plugin for the component supports deleting the runtime. |
| updateRuntime | Runtime can be updated if the runtime plugin for the component supports updating the runtime. |
| registerRuntime | Registers a pre-created runtime with LCM. At a minimum a runtime MUST be registered with LCM in order to perform subsequent operations on the runtime. |
| unregisterRuntime | Unregisters a runtime. A runtime can only be unregistered when LCM isn't managing any artifacts that reference the runtime. All partitions on the runtimes MUST be deleted before a runtime can be unregistered. If an attempt is made to unregister a runtime when there are references to it from LCM artifacts, an IllegalStateException MUST be thrown. |
| quiesceRuntime | If a runtime supports quiescing, the quiesceRuntime method on runtime manager will invoke the corresponding method for quiescing a runtime on the runtime plugin. If a runtime supports more than one phase for quiescing, for example start_quiesce and end_quiesce, the quiesce method could be called more than once with a phase. If a runtime doesn't have phases for quiescing, a null value for phase MUST be passed. If a runtime does not support quiescing, an UnsupportedOperationException MUST be thrown. |
| scaleUp | If a runtime supports scaling operations, the scaleUp method on runtime manager will scale the runtime up by invoking the corresponding runtime plugin to perform the operation of scaling up the runtime. If a runtime does not support scaleUp, an UnsupportedOperationException MUST be thrown. |
| scaleDown | If a runtime supports scaling operations, the scaleDown method on runtime manager will scale the runtime down by invoking the corresponding runtime plugin to perform the operation of scaling down the runtime. If a runtime does not support scaleDown, an UnsupportedOperationException MUST be thrown. |
| getRuntime(runtimeName) | Returns the runtime object with the specified name. If there is no runtime with the specified name, null will be returned. |
| getRuntimes(runtimeType) | Returns a list of runtimes for the specified runtime type. If there are no runtimes registered or created for the runtime type, null will be returned. |
| getRuntimes( ) | Returns a list of all the runtimes that LCM is managing. If no runtimes have been registered or created using LCM, null will be returned. |

In accordance with an embodiment, the following pseudo code illustrates how a WLS runtime and a Database runtime, which have been pre-created, are registered with lifecycle manager and are then subsequently used by lifecycle manager to create partitions on the runtimes:

```
@Inject
private RuntimeManager rtmMgr;
// Database is the type of the Runtime and DB1 is the actual instance
rtmMgr.registerRuntime("Database", "DB1", dbProps);
// WebLogic is the type of Runtime and WLSMTRuntime1 is the actual instance
rtmMgr.registerRuntime("WebLogic", "WLSMTRuntime1", wlsProps);
// You can lookup a specific Runtime or have RuntimeManager select
// one based on the type of the Runtime and some internal heuristics to determine
// which one to pick.
LifecycleRuntime wlsRuntime = rtmMgr.getRuntime("WLSRuntime1");
// Create a WLS Partition and a Slice/Partition of a Database LifecyclePartition
wlsPartition =
wlsRuntime.createPartition("cokeCRMWLSProdPartition", wlsPartitionProps);
// Get the Database runtime
Runtime dbRuntime = rtmMgr.getRuntime("DB1");
// Create a Database Partition (PDB in 12c Database case)
LifecyclePartition pdb = dbRuntime.createPartition("cokeCRMPDBProd", pdbProps);
```

Quiescing of Runtimes

In accordance with an embodiment, components such as WLS, which can include support for quiescing/graceful shutdown of runtimes, can support the quiescing capabilities via the lifecycle manager by implementing the quiescing support in the runtime plugin. Quiescing a runtime may have different phases. In such a scenario, the quiesce method of a runtime plugin may be invoked more than once, indicating the quiescing phase via the phase parameter in the quiesce method.

For example, there may be a "start_quiesce" phase, indicating that the server is beginning its quiescing phase thus notifying that no new requests be forwarded to the server that is being quiesced. After the quiescing is done, the subsequent call will have a phase "end_quiesce" phase indicating that the server is now ready to start accepting new requests again. If a component supports additional phases, those phases can be supported by the runtime plugin to ensure complete functionality.

The "start_quiesce", "end_quiesce" are examples of phases that a component might support and not a normative list of phases that every component must support. If a component does not support quiescing then an UnsupportedOperationException must be thrown. If a component does not support phases, a null value is a valid value that would be passed to the quiesce method.

Runtime Scaling

One of the advantages of a multi-tenant environment is to share hardware, resources and services across multiple applications and user groups, achieving economies of scale and allowing administrators to have the flexibility in assigning capacity as the needs of these users vary over time.

In accordance with an embodiment, lifecycle manager APIs provide the capability for other elasticity frameworks to be able to scale up and scale down runtimes. The runtime manager and runtime plugin provide scaleUp and scaleDown methods for users to call to scale a runtime.

In accordance with an embodiment, when scaleUp or scaleDown is called in runtime manager, the runtime plugin corresponding to the runtime type is looked up and the scaling operation is invoked on the instance of the runtime plugin. If a component does not support scaling operations, the implementation of the runtime plugin must throw an UnsupportedOperationException.

Runtime Plugin Implementation

In accordance with an embodiment, illustrated below is a pseudo code for a runtime plugin (for readability, this example does not implement all the abstract methods):

```
package com.oracle.weblogic.lifecycle.plugin.wls;
import com.oracle.weblogic.lifecycle.core.LifecyclePartitionImpl;
import org.jvnet.hk2.annotations.Service;
import com.oracle.weblogic.lifecycle.*;
@Service(name = "Weblogic")
public class WLSRuntimePlugin extends RuntimePlugin {
public void create(String runtimeName, LifecycleContext ctx) throws LifecycleException
// If a component wants to support creation of Runtimes via LCM,
// then the implementation of create for a Runtime will need to be provided
}
public void delete(String runtimeName, LifecycleContext ctx) throws LifecycleException
// If a component wants to support deleting of Runtimes via LCM,
// then the implementation of delete for a Runtime will need to be provided
}
public void update (String runtimeName, LifecycleContext ctx) throws LifecycleException
// If a component wants to support updating of Runtimes via LCM,
// then the implementation of update for a Runtime will need to be provided
}
public void scaleUp(String runtimeName, int scaleFactor, LifecycleContext ctx)
throws LifecycleException
// If a component wants to support scaleUp of Runtimes via LCM,
// then the implementation of scaleUp for a Runtime will need to be provided
}
...
```

Partition Plugin

In accordance with an embodiment, runtimes that support partitions (for example, slices of runtimes such as WLS, 12c Database etc) must provide an implementation of a partition plugin. When an operation on a runtime is invoked, such as createPartition, the implementation of partition plugin corresponding to the runtime type will be looked up as an HK2 service, and the corresponding create method will be invoked on the partition plugin implementation class. It is up to the implementation class to connect to the runtime and create the slice of the runtime. Once created, the partition is registered with lifecycle manager and persisted in the lifecycle-config.xml. In accordance with an embodiment, the runtime provides the following functions for partitions:

| Operation | Description |
| --- | --- |
| createPartition | Create a partition on the runtime that supports creation of a slice of a runtime. Throws UnsupportedOperationException if the runtime does not support slicing a runtime. |
| deletePartition | Delete a partition on the runtime that supports deletion of a slice of a runtime. Throws UnsupportedOperationException if the runtime does not support slicing a runtime. |
| updatePartition | Update a partition on the runtime that supports updating of a slice of a runtime. Throws UnsupportedOperationException if the runtime does not support slicing a runtime. |

-continued

| Operation | Description |
|---|---|
| registerPartition | Register a partition if the partition was created not using LCM but some other mechanism. Throws UnsupportedOperationException if a runtime does not support partitions/slicing a runtime. |
| getPartition | Get a partition by the name specified on the runtime that supports creation of a slice of a runtime. If the runtime supports partitions but does not have a partition with the specified name, a null value is returned. If the runtime does not support partitions/slicing of a runtime, this method MUST throw UnsupportedOperationException. |
| getPartitions | Returns a list of all partitions that have been created on the runtime. If the runtime supports partitions but does not have any partitions created on the runtime, a null value is returned. If the runtime does not support partitions/slicing of a runtime, this method MUST throw UnsupportedOperationException. |

In accordance with an embodiment, illustrated below is a pseudo code for a partition plugin. All operations in the plugin make a JMX connection to the actual WLS Runtime to perform the operations on the WLS Runtime in this example:

HK2 contract, with an implementation of these plugins as HK2 services. The HK2 service name must match the name of the service for which the plugin is registered. Plugin registration can be done in two ways: The plugins are packaged as a jar file and registered with lifecycle manager

```
package com.oracle.weblogic.lifecycle.plugin.wls;
import com.oracle.weblogic.lifecycle.core.LifecyclePartitionImpl;
import org.jvnet.hk2.annotations.Service;
import com.oracle.weblogic.lifecycle.*;
@Service(name = "Weblogic")
public class WLSPartitionPlugin extends PartitionPlugin {
@Override
public LifecyclePartition create(String partitionName, LifecycleContext ctx,
Lifecycle LifecycleException {
// Implementation of creating a WLS partition.
}
@Override
public abstract LifecyclePartition migrate(String partitionName, String phase,
LifecycleContext ctx,LifecycleRuntime runtime) throws LifecycleException
{
//Implementation of migration of a WLS Partition / Resource Group.
}
@Override
public abstract LifecyclePartition quiesce(String partitionName, String phase,
LifecycleContext ctx, LifecycleRuntime runtime) throws LifecycleException
{
//Implementation of migration of a WLS Partition / Resource Group.
}
@Override
public void delete(String partitionName, LifecycleContext ctx, LifecycleRuntime
runtime) throws LifecycleException
//Implementation of delete of a WLS Partition
}
@Override
public LifecyclePartition update(String partitionName, LifecycleContext ctx,
Lifecycle LifecycleException {
// Implementation of     update of a WLS Partition configuration
}
@Override
public void associate(LifecycleContext ctx, LifecyclePartition wlsPartition,
LifecyclePartition otherPartition, LifecycleRuntime runtime) throws
LifecycleException
// Associate two partitions (WLS partition with DB for example or WLS with OTD).
}
@Override
public void dissociate(LifecycleContext ctx, LifecyclePartition wlsPartition,
LifecyclePartition otherPartition, LifecycleRuntime runtime) throws
LifecycleException
//Dissociate previously associated partitions
}
}
```

Plugin Registration

As described above, in accordance with an embodiment, runtime plugins and partition plugins can be defined as an via REST commands; or drop the plugin implementation jars in a directory specified by lifecycle manager implementation which must be configurable by the, e.g., WLS System Administrator. The lifecycle manager will scan the directory at startup to load the plugins and register with lifecycle manager implementation. The default directory for placing the plugins is oracle_home/wlserver/common/lifecycle/plugins.

Environment

In a typical production system, there will generally be more than one artifact like a WLS partition, a Database partition, and others that will be required to run an application. In accordance with an embodiment, an environment provides a grouping construct for all the associated pieces of an application. The lifecycle manager allows the user to create an environment, which can then be used by the system administrator to group partitions for a given tenant. In accordance with an embodiment, an environment provides the following functions for partitions:

| Operation | Description |
| --- | --- |
| addPartition | Adds the given partition to the environment. |
| removePartition | Removes the given partition from the environment. |
| getPartitions(type) | Returns a list of all partitions of the given type in the environment. If the environment does not have any partitions of the specified type, null will be returned. |
| getPartitions | Returns a list of all partitions in the environment. If the environment does not have any partitions null will be returned. |
| associate | Associates (wires) two partitions in the environment. For more details see section below. |
| dissociate | Dissociates two partitions in the environment. For more details see section below. |
| migrate | Initiates migration of a partition. For more details see section below. |

Association of Partitions with Environments

In accordance with an embodiment, once a partition is added to an environment, it can be associated with the other partitions that were added to the environment.

For example, if an environment has a WLS partition and a database, associating the two will result in a DataSource being created in WLS referring to the database with which it is being associated. To associate two partitions, the partitions first need to be added to an environment. Once added to an environment, then an associate (e.g., Associate) method can be called on the environment passing in the two partitions that need to be associated. When associate is called on an environment, the corresponding plugin's associate method is called along with a lifecycle context (e.g., LifecycleContext) object. The lifecycle context should have the necessary information that is passed to the plugins to be able to do the necessary wiring of the two partitions. The associate method of partition plugins are invoked in the order in which they are passed into the environment's associate method call.

Dissociation of Partitions from Environments

In accordance with an embodiment, if a partition is no longer being used, references to that partition from other partitions in the environment need to be removed before it can be deleted. Dissociation provides a mechanism to unwire two partitions in an environment. When dissociation is called, the partition plugin's corresponding dissociate method is invoked and it is the responsibility of the plugin to remove the configuration that wire the two partitions together.

For example, if a WLS partition is dissociated from an OTD partition configuration, the routing information that was configured in OTD will be removed and no traffic to the partition will be routed via OTD. The dissociate method of partition plugins are invoked in the order in which they are passed into the method call.

Partition Migration

In accordance with an embodiment, runtimes that support migration of partitions, need to implement the migrate method of partition plugin. When migrating a partition, the other partitions that are associated with it may also need to take action. To address this, a migrate method acts on the environment. The lifecycle manager infrastructure must invoke the migrate method of the partition that is being migrated first, and then call the migrate method of the other partitions that are in the environment.

In accordance with an embodiment, the migrating of a partition may have different phases. In such a scenario, the migrate method of a partition plugin may be invoked more than once, indicating the migration phase via the phase parameter in the migrate method.

For example, there may be a "start_migration" phase, indicating that the partition migration phase is beginning. After the migration is done, the subsequent call will have a phase "end_migration" phase indicating that the partition has been migrated. If a partition supports additional phases, those phases can be supported by the partition plugin to ensure complete functionality.

The "start_migration", "end_migration" are examples of phases that a partition might support and not a normative list of phases that every partition must support. If a partition does not support migration then an UnsupportedOperationException must be thrown. If a partition does not support phases, a null value is a valid value that would be passed to the migrate method.

Quiescing of Partitions

In accordance with an embodiment, runtimes that support quiescing of partitions will need to implement the quiesce method of partition plugin. The lifecycle manager will check the state of partition to ensure that the partition is in a compatible state before trying to quiesce the partition.

Configuration Module

In accordance with an embodiment, the lifecycle manager includes a configuration module that manages the various configuration elements needed for its operation. The configuration module provides the necessary configuration infrastructure for various scenarios described here. The configuration module works in two modes: local—in which the lifecycle runs on admin server, configuration is persisted in an XML file in the WLS config directory; and HA—in which the lifecycle can run on a cluster, configuration is persisted in a database. In either case, lifecycle configuration uses the HK2 framework to manage configurations.

Lifecycle Configuration File Propagation

In accordance with an embodiment, when changes are made to the configuration file on the admin server, those changes must be propagated to all managed servers. The managed servers use the lifecycle configuration to establish the right tenant context for applications running on the managed server. HK2 config objects do not allow a reparsing of the xml configuration file. Instead, a new object must be instantiated and the updated xml file parsed fresh. When a configuration change is committed, the XML file is saved into a special directory, namely, the pending directory for the domain.

File Transfer to Managed Servers

In accordance with an embodiment, a LifecycleConfigDocument save( ) method is called by HK2 whenever a change has been committed. This method also saves a copy of the file to the pending directory, and then calls the following API which triggers the uploading of the changed file to managed servers:
ConfigurationManagerMBean.startEdit( . . . ) ConfigurationManagerMBean.activate( . . . )

Watching for Changes

In accordance with an embodiment, a FileWatcher daemon, started on the first parse of the configuration file, will detect that the xml file has changed. It will then create a new config object and parse the xml file. Any callers will be blocked trying to access information during the parsing. As soon as the parsing is complete, the modified data will be available for callers.

Accessing the Configured Data

In accordance with an embodiment, the HK2 configuration can be exposed with with LifecycleConfigFactory class, for example:

```
@Service
public class LifecycleConfigFactory implements PostConstruct {
public LifecycleConfig getLifecycleConfig( );
public synchronized void reloadLifecycleConfig( );
}
```

Edit Sessions

In accordance with an embodiment, for REST requests, that require a change in WLS configuration, each REST call creates and manages edit sessions on behalf of a user. This is similar to the 'implicit changes' in development mode in the console.

LifecycleTask

There are certain operations performed via lifecycle manager that are naturally long running asynchronous operations. Examples of such operations are: quiescing Server (runtime manager.quiesce); or starting a Server (runtime manager.quiesce). In such scenarios the semantic of lifecycle manager API can be made asynchronous, to return a LifecycleTask object from these APIs.

LifecycleTaskManager

Generally, when a user performs an asynchronous operation and receives a LifecycleTask object back, they can do one of two things with that object: get a status of the Asynchronous operation represented by the lifecycle task; or cancel the asynchronous operation represented by the lifecycle task. In accordance with an embodiment, the above operations are performed by the interfaces exposed by LifecycleTaskManager:

| Operation | Description |
| --- | --- |
| getTaskStatus | Get the status of an async operation represented by LifecycleTask. |
| cancelTask | Cancel the async operation represented by LifecycleTask. |

Lifecycle APIs and Classes

In accordance with various embodiments, examples of lifecycle interfaces and classes are described below. In accordance with other embodiments, other types of interfaces and classes can be provided.

Lifecycle Manager

In accordance with an embodiment, an exemplary Lifecycle Manager interface is described below:

```
package com.oracle.weblogic.lifecycle;
import java.util.List;
import org.jvnet.hk2.annotations.Contract;
@Contract
public interface LifecycleManager {
/**
*       @param environmentName
*       @return object Environment
*       This interface for creating a named logical Entity called Environment
*/
public Environment createEnvironment(String environmentName);
/**
*       @param environmentName
*       This interface for deleting a named logical Entity called * Environment
*/
public void deleteEnvironment(String environmentName);
/**
*       @param environmentName
*       @return object Environment
*       This interface for getting Environment object given its name
*/
public Environment getEnvironment(String environmentName);
/**
*       @param partitionId
*       @param runtimeName
*       @return object Environment
*       This interface for getting Environment object partition Id and
*/
public Environment getEnvironment(String partitionId, String runtimeName);
/**
*       @return List of Environment
*       This interface has responsibility for getting all Environments.
*/
public List<Environment> getEnvironments( );
/**
*       This interface has responsibility for syncing all Environments.
*       This call force sync partitions in an environment for all Environments
*/
public void syncEnvironments( );
/**
```

-continued

```
 *   This interface has responsibility for syncing a named Environment.
 *   This call force sync partitions in an environment for given named
Environment
 */
    public void syncEnvironment(String environmentName);
    }
```

Runtime Manager.Java

In accordance with an embodiment, an exemplary Runtime Manager.Java interface is described below:

```
package com.oracle.weblogic.lifecycle;
import java.util.List;
import java.util.Map;
import org.jvnet.hk2.annotations.Contract;
@Contract
public interface RuntimeManager {
/**
 *   @param runtimeType The type of runtime for which the runtime is being
created
 *   @param runtimeName The name of the runtime for the runtime being created
 *   @param properties  Properties to be passed to the runtime plugin
 *   @return
 *   @throws LifecycleException is thrown if the operation fails.
 */
public LifecycleRuntime createRuntime(String runtimeType, String runtimeName,
Map<String, PropertyValue> properties) throws LifecycleException
/**
 *   @param runtimeType The type of runtime being deleted (not sure if we
 *   need this  if we can determine the type from the runtime)
 *   @param runtimeName The name of the Runtime being deleted
 *   @throws LifecycleException thrown if the operation fails.
 */
public void deleteRuntime(String runtimeType, String runtimeName)
throws LifecycleException;
/**
 *   @param runtimeType The type of runtime being updated (not sure if we
 *   need this  if we can determine the type from the runtime)
 *   @param name   The name of the Runtime being updated
 *   @param properties  Properties to be passed to the runtime plugin
 *   @return
 *   @throws LifecycleException thrown if the operation fails.
 */
public LifecycleRuntime updateRuntime(String runtimeType, String name,
Map<String, PropertyValue> properties) throws LifecycleException
/**
 *   @param runtimeType The type of runtime being operated on
 *   @param name   The name of the Runtime being operated on
 *   @param phase Phase for operation
 *   @param properties  Properties to be passed to the runtime plugin
 *   @return
 *   @throws LifecycleException thrown if the operation fails.
 */
public LifecycleTask quiesceRuntime(String runtTimeType, String name, String
phase, M
/**
 *   @param runtimeType The type of runtime being operated on
 *   @param name   The name of the Runtime being operated on
 *   @param phase Phase for operation
 *   @param properties  Properties to be passed to the runtime plugin
 *   @return
 *   @throws LifecycleException thrown if the operation fails.
 */
public LifecycleTask startRuntime(String runtTimeType, String name, String phase,
Map
/**
 *   @param runtimeType The type of runtime being registered
 *   @param runtimeName The name of the runtime being registered
 *   @param properties  Properties to be passed to the runtime plugin
 *   @throws LifecycleException if the register operation fails
 */
```

```
public void registerRuntime(String runtimeType, String runtimeName,
Map<String, PropertyValue> properties) throws LifecycleException
/**
 *      @param runtimeType The type of runtime being unregistered
 *      @param runtimeName The name of the runtime being unregistered
 *      @throws LifecycleException if the register operation fails
 */
public void unregisterRuntime(String runtimeType, String runtimeName)
throws LifecycleException;
/**
 *      @param runtimeType The type of runtime being scaled up
 *      (not sure if we need this   if we can determine
 *      the type from the runtime)
 *      @param runtimeName The name of the Runtime being scaled up
 *      @param scaleFactor The factor by which it is being scaled up.
 *      @param properties   Properties to be passed to the runtime plugin
 *      @throws LifecycleException   thrown if the operation fails.
 *      @throws UnsupportedOperationException if the operation isn't supported
 *      by the runtime type
 */
public LifecycleTask scaleUp(String runtimeType, String runtimeName, int
scaleFactor,
Map properties) throws LifecycleException;
/**
 *      @param runtimeType The type of runtime being scaled down
 *      (not sure if we need this   if we can determine
 *      the type from the runtime)
 *      @param runtimeName The name of the Runtime being scaled down
 *      @param scaleFactor The factor by which it is being scaled down.
 *      @param properties   Properties to be passed to the runtime plugin
 *      @throws LifecycleException   thrown if the operation fails.
 *      @throws UnsupportedOperationException if the operation isn't supported
 *      by the runtime type
 */
public LifecycleTask scaleDown(String runtimeType, String runtimeName, int
scaleFactor
Map properties) throws LifecycleException;
/**
 *      Get the specified Runtime
 *
 *      @param runtimeName Get the specific runtime by name.
 *      @return
 */
public LifecycleRuntime getRuntime(String runtimeName);
/**
 *      Get a List of runtimes for the specified runtime type.
 *
 *      @param runtimeType Get all the runtimes for the given runtime type
 *      @return List of LifecycleRuntimes
 */
public List<LifecycleRuntime> getRuntimes(String runtimeType);
/**
 *      Get a list of all the runtimes.
 *
 *      @return List of Runtimes.
 */
public List<LifecycleRuntime> getRuntimes( );
}
```

Lifecycle Runtime

In accordance with an embodiment, an example Lifecycle Runtime interface is described below:

```
package com.oracle.weblogic.lifecycle;
import java.io.File; import java.util.List; import java.util.Map;
import java.util.Properties;
public interface LifecycleRuntime {
/**
 *      Get the name of the Runtime
 *      @return the name of the runtime
 */
public String getRuntimeName( );
/**
 *      The type of service of the runtime
 *      @return the type of the runtime
 */
```

```
public String getRuntimeType( );
public void applyPartitionTemplate(File partitonTemplate);
/**
*       The properties that represent the runtime
*       @return the type of the runtime
*/
public Properties getRuntimeProperties( );
/**
*       Create a partition on this Runtime
*       @param partitionName The name of the partition
*       @param properties Properties passed to the plugin.
*       @return
*/
public LifecyclePartition createPartition(String partitionName, Map properties)
throws
/**
*       Delete the specified Partition
*       @param partitionName The specified named Partition to be deleted
*/
public void deletePartition(String partitionName, Map properties) throws
LifecycleException
/**
*       Update the specified Partition
*       @param partitionName The specified named Partition being updated
*       @param properties Properties passed to the plugin.
*       @return
*/
public LifecyclePartition updatePartition(String partitionName, Map properties)
throws
/**
* @return List of Partitions on this Runtime
*/
public List<LifecyclePartition> getPartitions( );
/**
*       Get the specific named Partition.
*       @param partitionName The name of the Partition to get.
*       @return
*/
public LifecyclePartition getPartition(String partitionName);
/**
*       Register a partition on this Runtime with LCM
*       @param partitionName The name of the partition
*       @param partitionId The ID of the partition
*       @return
*       @throws com.oracle.weblogic.lifecycle.LifecycleException
*/
public void registerPartition(String partitionName, String partitionId);
/**
*       UnRegister a partition on this Runtime with LCM
*       @param partitionName The name of the partition
*       @return
*       @throws com.oracle.weblogic.lifecycle.LifecycleException
*/
public void unregisterPartition(LifecyclePartition partition);
}
```

Lifecycle Partition

In accordance with an embodiment, an exemplary Lifecycle Partition package is described below:

```
package com.oracle.weblogic.lifecycle;
public interface LifecyclePartition {
```

```
public String getName( ); public String getType( ); public String getId( );
public String getRuntimeName( );
}
```

Runtime Plugin

In accordance with an embodiment, an exemplary Runtime Plugin class is described below:

```
package com.oracle.weblogic.lifecycle;
import org.jvnet.hk2.annotations.Contract;
@Contract
public abstract class RuntimePlugin {
/**
*       @param runtimeName
*       @param ctx
```

```
*         @throws com.oracle.weblogic.lifecycle.LifecycleException
*         Implementation of method should facilitate creation of runtimes using
runtime
*/
public abstract void create(String runtimeName, LifecycleContext ctx) throws
LifecycleException
/**
*         @param runtimeName
*         @param ctx
*         @throws com.oracle.weblogic.lifecycle.LifecycleException
*         Implementation of method should facilitate deletion of runtimes using
runtime
*/
public abstract void  delete(String runtimeName, LifecycleContext ctx) throws
LifecycleException
/**
*         @param runtimeName
*         @param ctx
*         @throws com.oracle.weblogic.lifecycle.LifecycleException
*         Implementation of method should facilitate updates of runtimes using
runtimeN
*/
public abstract void update (String runtimeName, LifecycleContext ctx) throws
LifecycleException
/**
*         @param runtimeName
*         @param scaleFactor
*         @param ctx
*         @throws com.oracle.weblogic.lifecycle.LifecycleException
*         Implementation of this method should facilitate scaleUp of runtime
*/
public abstract LifecycleTask scaleUp(String runtimeName, int scaleFactor,
Lifecycle
/**
*         @param runtimeName
*         @param scaleFactor
*         @param ctx
*         @throws com.oracle.weblogic.lifecycle.LifecycleException
*         Implementation of this method should facilitate scaleDown of runtime
*/
public abstract LifecycleTask scaleDown(String runtimeName, int scaleFactor,
LifecycleContext
/**
*         @param runtimeName
*         @param ctx
*         @throws com.oracle.weblogic.lifecycle.LifecycleException
*         Implementation of this method should facilitate quiesce of runtime
*/
public abstract LifecycleTask quiesce(String runtimeName, String phase,
LifecycleContext
/**
*         @param runtimeName
*         @param ctx
*         @throws com.oracle.weblogic.lifecycle.LifecycleException
*         Implementation of this method should facilitate start of runtime
*/
public abstract LifecycleTask start(String runtimeName, String phase,
LifecycleContext
}
```

Partition Plugin

In accordance with an embodiment, an exemplary Partition Plugin class is described below:

```
package com.oracle.weblogic.lifecycle;
import org.jvnet.hk2.annotations.Contract;
@Contract
public abstract class PartitionPlugin {
/**
*         @param partitionName
*         @param ctx
*         @param runtime
*         @return
*         @throws com.oracle.weblogic.lifecycle.LifecycleException
*         Implementation of method should facilitate creation of a Partition for a
specific
```

```
*       Component that the Plugin represents.
*/
public abstract LifecyclePartition create(String partitionName,
LifecycleContext ctx, LifecycleRuntime runtime)
/**
throws LifecycleException;
*       @param partitionName
*       @param phase
*       @param ctx
*       @param runtime
*       @return
*       @throws com.oracle.weblogic.lifecycle.LifecycleException
*       Implementation of method should facilitate migration of a Partition for a
specific
*       Component that the Plugin represents.
*/
public abstract LifecyclePartition migrate(String partitionName,
String phase, LifecycleContext ctx, LifecycleRuntime runtime)
/**
throws LifecycleException;
*       @param partitionName
*       @param ctx
*       @param runtime
*       @throws com.oracle.weblogic.lifecycle.LifecycleException
*       Implementation of method should facilitate deletion of a Partition for a
specific
*       Component that the Plugin represents.
*/
public abstract void delete(String partitionName,
LifecycleContext ctx, LifecycleRuntime runtime)
throws LifecycleException;
/**
*       @param partitionName
*       @param ctx
*       @param runtime
*       @return
*       @throws com.oracle.weblogic.lifecycle.LifecycleException
*       Implementation of method should facilitate update of a Partition for a
specific
*       Component that the Plugin represents.
*/
public abstract LifecyclePartition update(String partitionName,
LifecycleContext ctx, LifecycleRuntime runtime)
/**
throws LifecycleException;
*       @param partitionName
*       @param ctx
*       @param runtime
*       @return List<LifecycleTask>
*       @throws com.oracle.weblogic.lifecycle.LifecycleException
*       Implementation of method should facilitate quiesce of a Partition.
*/
public abstract List<LifecycleTask> quiesce(String partitionName,
String phase, LifecycleContext ctx, LifecycleRuntime runtime)
/**
throws LifecycleException;
*       @param partitionName
*       @param ctx
*       @param runtime
*       @return List<LifecycleTask>
*       @throws com.oracle.weblogic.lifecycle.LifecycleException
*       Implementation of method should facilitate start of a Partition.
*/
public abstract List<LifecycleTask> start(String partitionName,
String phase, LifecycleContext ctx, LifecycleRuntime runtime)
throws LifecycleException;
/**
*       @param ctx
*       @param partition1
*       @param partition2
*       @param runtime
*       @throws com.oracle.weblogic.lifecycle.LifecycleException
*       Implementation of this method should facilitate association of two
Partitions.
*/
```

```
    public abstract void associate(LifecycleContext ctx,
    LifecyclePartition partition1, LifecyclePartition partition2,
    /**
    throws LifecycleException;
    LifecycleRuntime runtime)
    *       @param ctx
    *       @param partition1
    *       @param partition2
    *       @param runtime
    *       @throws com.oracle.weblogic.lifecycle.LifecycleException
    *       Implementation of method should facilitate disassociation of two
    Partitions.
    */
    public abstract void dissociate(LifecycleContext ctx,
    LifecyclePartition partition1, LifecyclePartition partition2, LifecycleRuntime
    runtime)
    throws LifecycleException;
    }
```

Environment

In accordance with an embodiment, an exemplary Environment interface is described below:

```
package com.oracle.weblogic.lifecycle;
import java.util.List;
import java.util.Map;
public interface Environment {
/**
*
* @return Name of environment
*/
public String getName( );
/**
*
* @param partition
*/
public void addPartition(LifecyclePartition partition);
/**
*
*       @param partitionType
*       @param partitionName
*/
public void removePartition(String partitionType,
String partitionName);
/**
*
* @return
*/
public List<LifecyclePartition> getPartitions( );
/**
*
*       @param partitionType
*       @return
*/
public List<LifecyclePartition> getPartitions(String partitionType);
/**
*       Migrate the specified Partition
*       @param partition The specified named Partition being updated
*       @param runtime the runtime on which the partition exists
*       @param properties Properties passed to the plugin.
*/
public void migratePartition(LifecyclePartition lifecyclePartition,
LifecycleRuntime runtime, String phase, Map properties) throws LifecycleException;
/**
*
*       @param partition1
*       @param partition2
*/
public void associate(LifecyclePartition partition1, LifecyclePartition
partition2, Map partitionProperties) throws LifecycleException;
/**
*
*       @param partition1
*       @param partition2
*/
public void dissociate(LifecyclePartition partition1, LifecyclePartition
```

```
partition2, Map partitionProperties) throws LifecycleException;
/**
*
*       @param lifecyclePartition
*       @param phase
*       @param properties
*/
public Map<String, List<LifecycleTask>> quiesce(LifecyclePartition
lifecyclePartition, String phase, Map properties) throws LifecycleException ;
/**
*
*       @param lifecyclePartition
*       @param phase
*       @param properties
*/
public Map<String, List<LifecycleTask>> start(LifecyclePartition
lifecyclePartition,String phase, Map properties)
throws LifecycleException ;
}
```

Lifecycle Context

In accordance with an embodiment, an exemplary Lifecycle Context interface is described below:

```
package com.oracle.weblogic.lifecycle;
import java.util.Map;
public interface LifecycleContext {
/**
*       Map of properties that are passed from the client to the plugin
*       @return
*/
public Map getProperties( );
}
```

Lifecycle Operation Type

In accordance with an embodiment, an example Lifecycle Operation Type enumerator is described below:

```
package com.oracle.weblogic.lifecycle;
public enum LifecycleOperationType {
CREATE_RUNTIME,DELETE_RUNTIME, UPDATE_RUNTIME,
SCALE_UP_RUNTIME, SCALE_DOWN_RUNTIME,
CREATE_PARTITION, DELETE_PARTITION,
UPDATE_PARTITION, MIGRATE_PARTITION
}
```

Lifecycle Task

In accordance with an embodiment, an example Lifecycle Task interface is described below:

```
import java.util.Map;
public interface LifecycleTask
{
/**
*       Get the type of component the task represents
*
*       @return the type of the task ( ex:wls)
*       @includeapi forpublicapi
*/
public String getComponentType( );
/**
*       The properties that represent the task
*
*       @return the Properties of the task
*       Example: used to store things like servername in case of
server operation
*/
public Map getProperties( );
}
```

Lifecycle Task Manager

In accordance with an embodiment, an exemplary Lifecycle Task Manager interface is described below:

```
import org.jvnet.hk2.annotations.Contract;
import java.util.Map;
@Contract
public interface LifecycleTaskManager {
public String getTaskStatus(String runtimeName, String taskType,
Map properties )
throw public void cancelTask(String runtimeName, String taskType,
Map properties )
throws LifecycleException
}
```

Figure 10:
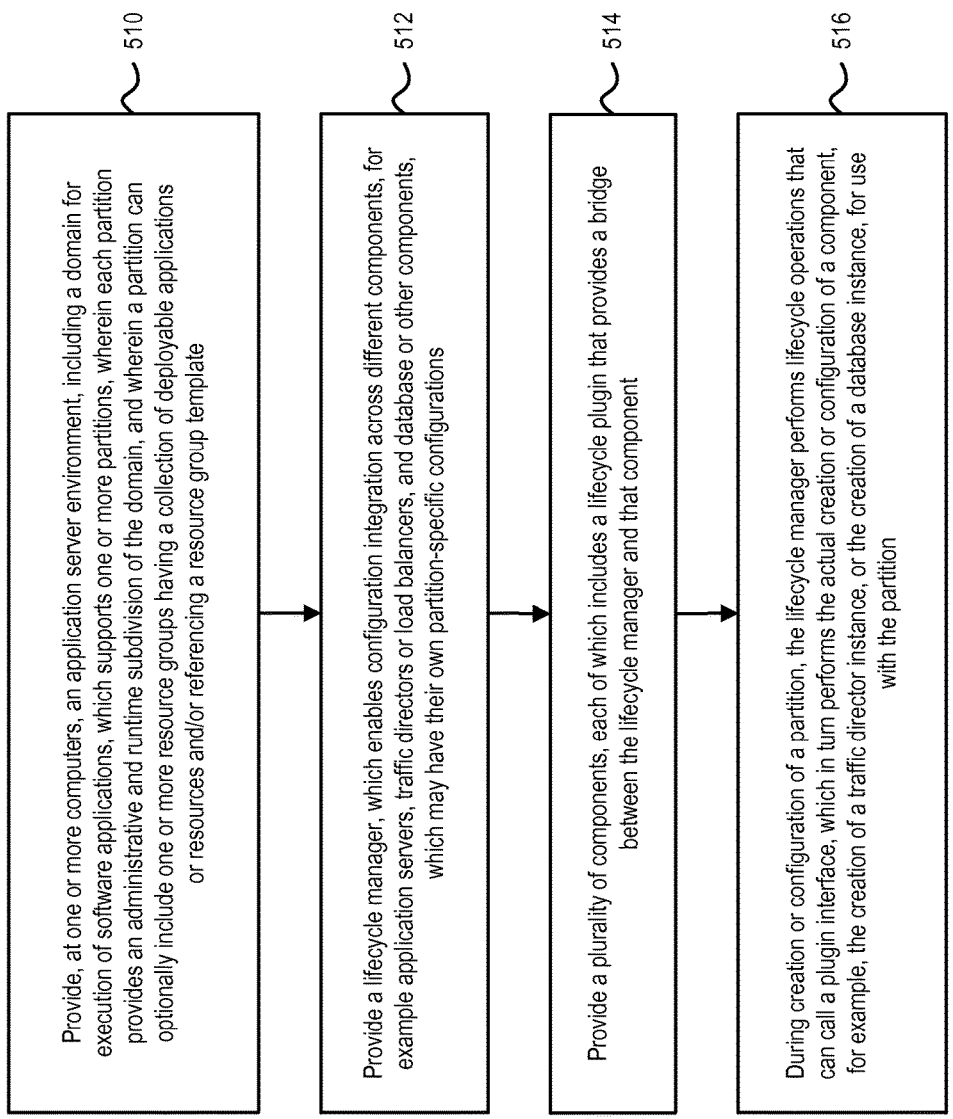
FIG. 10 illustrates a flowchart of method for providing end-to-end lifecycle in a multitenant application server environment, in accordance with an embodiment.

FIG. 10 illustrates a flowchart of method for providing end-to-end lifecycle in a multitenant application server environment, in accordance with an embodiment.

As illustrated in FIG. 10, at step 510, an application server environment is provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 512, a lifecycle manager is provided, which enables configuration integration across different components, for example application servers, traffic directors or load balancers, and database or other components, which may have their own partition-specific configurations.

At step 514, a plurality of components are provided, each of which includes a lifecycle plugin that provides a bridge between the lifecycle manager and that component.

At step 516, during creation or configuration of a partition, the lifecycle manager performs lifecycle operations that can call a plugin interface, which in turn performs the actual creation or configuration of a component, for example, the creation of a traffic director instance, or the creation of a database instance, for use with the partition.

Tenant Onboarding

In accordance with an embodiment, the system includes support for a tenant onboarding functionality, which can be used to onboard a tenant for a service to a particular partition.

For example, in accordance with an embodiment that includes Fusion applications (FA), the system can provide a mechanism to onboard an FA tenant for a service to a given partition. In accordance with an embodiment, each environment can be associated with a service in the upper stack. When onboarding the tenant, information such as which partition is the FA service using, the tenant's database associated with the service, as well as the top-level tenant directory, can be specified.

In accordance with an embodiment, the system provides an API to map a tenant to a given partition. For incoming requests, the system can determine the tenant from the configuration and use that information to establish a tenancy context at runtime. When queried using, e.g., a Java Required Files (JRF) API, the appropriate tenancy context can then be made available to the application.

For example, as described above, the system can be used to create an environment, so that an e.g., FA tenant can be onboarded, and so that upper stack components, such as Oracle Platform Security Services (OPSS), and Service Oriented Architecture (SOA) can then obtain access to provision that environment, so that the finally-configured environment will have all of the components that the tenant will need.

In accordance with an embodiment, a tenant can have one or more different services. For example, a tenant can have a Customer Relationship Management (CRM) service and/or a SOA service. Generally, each service in the upper stack can be associated with one or more environment in the application server, which means that a tenant signing up for two services in the upper stack will generally receive two environments, with the environments being linked at the tenant level.

For example, if a tenant signs up for SOA and Business Process Management (BPM) services, then the tenant will receive a SOA environment and a BPM environment, and these environments will both be linked by that tenant. Each application within an environment can use a remote call, e.g., as an HTTP or a T3 call, to another environment associated with that tenant, if necessary.

As described above, in accordance with an embodiment, the system recognizes the concepts of tenancy context and partition context, with the former generally containing more information. A particular service may include several slices or partitions of various components, for example an application server (e.g., WebLogic, WLS), database (e.g., Database), and traffic director or other load balancer (e.g., Oracle Traffic Director, OTD). A tenant context maps to a partition context for a particular tenant, in the manner of indicating a service and how that service maps to the partition context.

Figure 11:
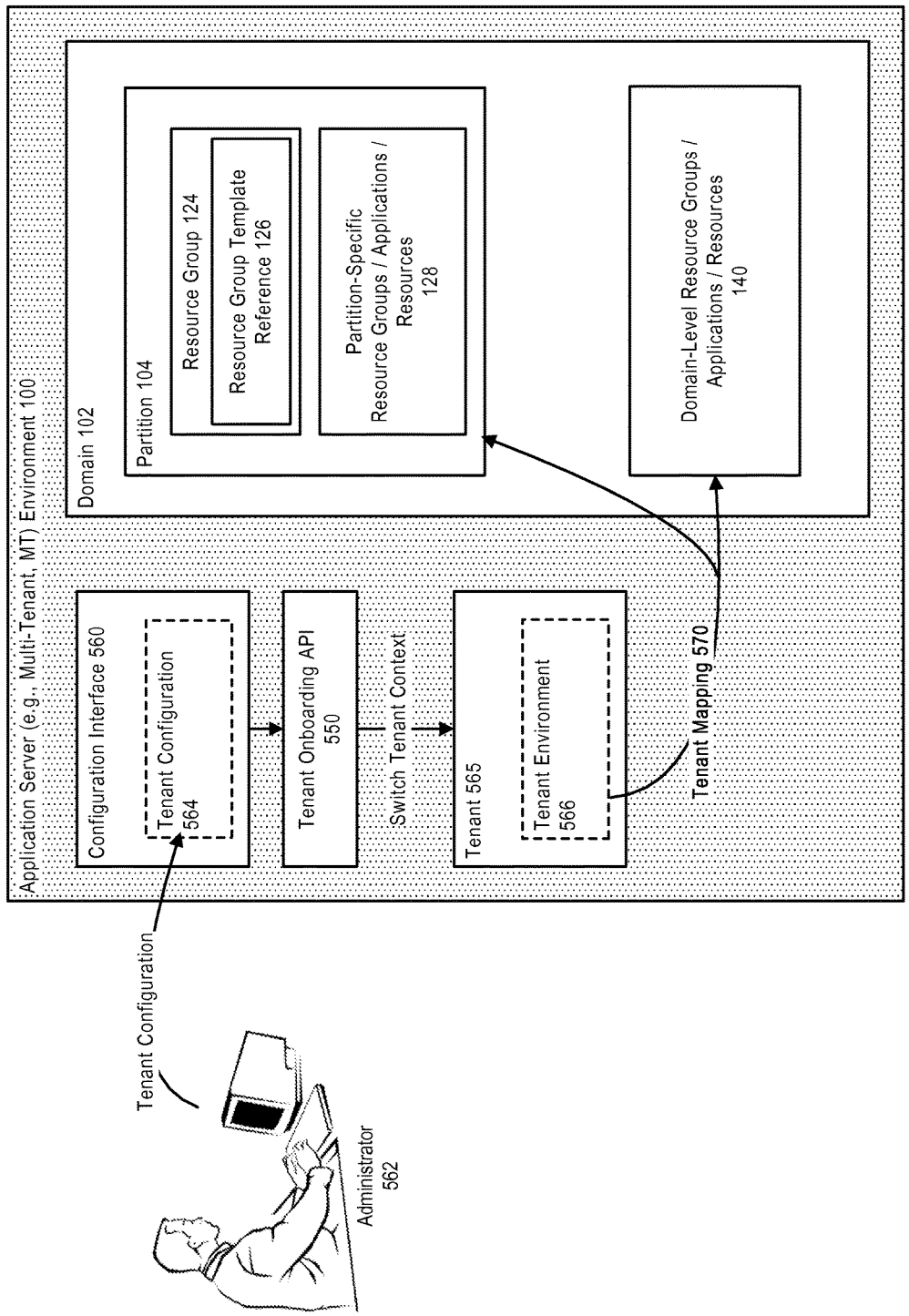
FIG. 11 illustrates tenant onboarding in a multitenant application server environment, in accordance with an embodiment.

FIG. 11 illustrates tenant onboarding in a multitenant application server environment, in accordance with an embodiment.

As illustrated in FIG. 11, in accordance with an embodiment, a tenant onboarding API 550 and configuration interface 560 allows an administrator 562 to provide a tenant configuration 564. The tenant onboarding process can then use that information to create a tenant 565 having a UUID and environment 566, and map that tenant's environment 570 to the appropriate partition or domain-level resources.

In accordance with an embodiment, each tenant can be associated with a globally unique ID (UUID), and each service can be similarly associated with a UUID. This allows the system to operate in the context of whichever service is being called to look up the tenant context. The system also provides the ability to switch between different tenant contexts to execute a particular task, which is generally referred to herein in various embodiments as ExecuteAs functionality.

For example, in an application server (e.g., WLS) environment, a global or domain level runtime can be provided, as further described below. A product or component in the upper stack (e.g., FA, SOA, or BPM) may want to switch to a given tenant context, for example for onboarding a particular tenant to a particular service. When that tenant is onboarded, the upper stack software running at the global or domain level can temporarily switch to that tenant, and perform any necessary tasks e.g., with the traffic director, or the database.

Generally, the system can switch from a global level context to a tenant context only, and not the other way around, such that an executeAs operation can only be executed from a global to tenant contexts, but not from a tenant to tenant context.

Switching of Tenancy Context

In accordance with an embodiment, the system can determine a partition context automatically based on request attributes such as a target component that may be currently handling the request. The partition context of the thread generally changes whenever the request enters a component that is deployed to a different partition.

For example, when a servlet running in one partition calls a remote component such as an Enterprise Java Bean (EJB) or a servlet or a web service deployed in another partition, the remote call is executed in the partition hosting the target component.

In this case, the underlying platform takes care of setting the appropriate partition context before calling the business method of the target component. An application developer can make use of this facility when they want to execute code under a different partition context.

In accordance with an embodiment, tenancy context switching also supports simple use cases, for example where an application sets the context before making a call to a shared service which may run in the same thread sharing the component context of the caller. In such cases partition context switching is neither required nor desired.

Tenancy Context Switching as a Privileged Operation

In accordance with an embodiment, only privileged application code, such as the global runtime, can switch tenancy context. Therefore, the API must enforce appropriate security permission checks before allowing access. Permissions can be granted that include the target tenancy being set.

Protection Against Illegal Tenancy Switching

In accordance with an embodiment, the table below describes which context switches are allowed, subject to security privileges of the code:

| Current Application Tenancy | New Application Tenancy | Possible or Not |
| --- | --- | --- |
| GLOBAL | Any valid tenancy context | Possible |
| GLOBAL | GLOBAL | Possible |
| Tenant | GLOBAL | Impossible |
| Tenant-i | Tenant-i | Impossible |
| Tenant-i | Tenant-j | Impossible |
| null | Any tenancy context | Impossible |

In accordance with an embodiment, in, for example, an FA scenario, the process of tenant onboarding can be initiated by communicating with the provisioning system. In some situations, such as the case of FA running on a multi-tenant application server such as a WLS server, the process of tenant onboarding requires creation of partitions on runtimes which are setup by the provisioning sub-system.

In accordance with an embodiment, prior to onboarding a tenant, an environment representing the service for which the tenant is signing up for has to be created. The FA provisioning sub-system can call into the lifecycle manager API to first create an environment. Once an environment has been created, a tenant can be onboarded via a tenant admin (e.g., TenantAdmin) class, an example of which is illustrated below. The tenant admin can then expose an API (e.g., registerTenant) to register a tenant.

Once a tenant is registered, a database created by the provisioning infrastructure can be registered with the tenant admin for a given tenant. At this point, the system can onboard a tenant to its environment. Onboarding a tenant requires the service name and service type (available from FA) to be passed, in order to maintain a mapping for the tenant to an environment. The tenant mapping can be stored in lifecycle-config.xml.

In accordance with an embodiment, below is an exemplary code for tenant mapping stored in the lifecycle-config.xml:

```
<tenants>
    <tenant name="coke" id="123" top-level-dir="coke/top/level/dir">
        <service type="CRMService" name="CRMProd"
environment-ref="coke-crmenv-prod"/>
        <service type="CRMService" name="CRMTest"
environment-ref="coke-crmenv-test"/>
            name="HCMProd" <service type="CRMService"
environment-ref="coke-hcmenv-prod"/>
    </tenant>
    <tenant name="pepsi" id="456" top-level-dir="pepsi/top/level/dir">
        <service type="HCMService" name="HCMProd"
environment-ref="pepsi-hcmenv-prod"/>
    </tenant>
</tenants>
```

In accordance with an embodiment, at runtime, the tenant context (e.g., TenantContext) is available via a TenantContext/TenantContextFactory. An API to get a TenantContext for a given partition or tenant database is defined in the TenantManager class defined below. All of the tenant admin APIs for registering a tenant and the corresponding tenant database and environment can be exposed via a REST API when running in WLS. When running on Java SE the Java APIs can be used directly. An exemplary pseudo code is shown below describing the process above to onboard a tenant on WLS environment:

```
@Inject
TenantAdmin tenantAdmin
@Inject
RuntimeManager rtmMgr;
@Inject
LifecycleManager lcmMgr;
// Database is the type of the Runtime and DB1 is the actual instance
rtmMgr.registerRuntime("Database", "DB1", props);
rtmMgr.registerRuntime("WebLogic", "WLSMTRuntime1", props);
// You can lookup a specific Runtime or have RuntimeManager select
one based on type
// and some internal heuristics to determine which one to pick.
Runtime wlsRuntime = rtmMgr.getRuntime("WLSRuntime1");
or
Runtime wlsRuntime = rtmMgr.selectRuntime("WebLogic");
//Create a WLS Partition and a PDB
LifecyclePartition wlsPartition =
wlsRuntime.createPartition("cokeCRMWLSProdPartition", Runtime
dbRuntime = rtmMgr.getRuntime("DB1");
LifecyclePartition pdb =
dbRuntime.createPartition("cokeCRMPDBProd", props);
Environment cokeEnv =
lcmMgr.createEnvironment("coke-crmenv-prod");
cokeEnv.addPartition(wlsPartition);
cokeEnv.addPartition(pdb);
//Tenant ID and name are provided by Provisioning to LCM Tenant
tenant = tenantAdmin.registerTenant("111", "coke");
tenantAdmin.onBoard(tenant, "CRMService","CRMProd", cokeEnv);
```

In the code above, if the DB partition is not created using a lifecycle manager, but instead performed by provisioning, then provisioning will call registerDatabase as opposed to createPartition on the DB1 runtime object.

```
LifecycleRuntime runtime = rtmMgr.getRuntime("DB1");
runtime.registerDatabase("111", "cokeCRMPDBProd");
```

Tenant Context

In accordance with an embodiment, in FA/SaaS and similar scenarios where the applications themselves may be expected to be multi-tenant aware, then in addition to the partition ID and partition name, they need to know the tenant on behalf of which a certain operation is being performed. A tenant context (e.g., TenantContext) API can be made available in the JRF layer for upper stack FMW/FA to use to get the appropriate tenant context.

```
TenantContextFactory tcFactory =
TenantContextFactory.getTenantContextFactory( );
TenantContext tenantContext = tcFactory.getTenantContext( );
```

Once a tenant context is determined, a component can lookup the partition(s) associated with the environment for a given service.

```
Environment env = tenantContext.getEnvironment( );
List<Partitions> partitions = env.getPartitions( ); Iterator iterator =
partitions.iterator( );
while (iterator.hasNext( )) {
LifecyclePartition partition = iterator.next( );
if (partition.getType.equals("WebLogic")) {
String partitionId = partition.getId( ); String partitionName =
partition.getName( );
}
}
```

Support for Java SE for Tenant Mapping.

In accordance with an embodiment, the following is an exemplary code which can be used in SE to retrieve a tenant context:

```
TenantContextFactory tcFactory =
TenantContextFactory.getTenantContextFactory( );
TenantContext tenantContext = tcFactory.getTenantContext( );
```

For Java SE, a method can be exposed in TenantManager which will fetch a tenant context based on a tenant ID, service name and service Type. The setting up of tenant context can be done implicitly by the TenantContextFactory when getTenantContext( ) is called for the first time.

Config File Bootstrap in SE

In accordance with an embodiment, the tenant mapping can be stored in lifecycle-config.xml as mentioned in previous section. In SE, the system can look for this file in (a) a location pointed to by environment variable lifecycle.configDir; or (b) if a lifecycle.configDir variable is not set, then the user working directory, which can be read using: System.getProperty("user.dir");

Specifying Tenant Information in SE

In accordance with an embodiment, when running in JAVA SE mode, the information identifying a tenant can be read using the following system properties. lifecycle.tenantId lifecycle.serviceName lifecycle.serviceType; or by specifying the service UUID via system property lifecycle.serviceId The above information uniquely identifies a tenant, and can be used to identify a unique tenant plus service combination present in the lifecycle configuration. The SE application assumes the identity and that is represented when TenantContextFcatory.getTenantContext is called.

Tenant Context in SE

In accordance with an embodiment, the tenant context in SE is stored on InheritableThreadLocal. When getTenantContext( ) method is called for the first time, it uses the system properties to compute the tenant context and stores it also on InheritableThreadLocal.

Upon further calls to same method, the system checks to see if at tenant context is stored on Inheritable ThreadLocal and will return what has been saved. If in the middle of the program execution, the system properties are changed, these changes may or may not be detected and used to refresh the tenant context on the Inheritable Thread Local.

Switching with switchTenantContext (aka executeAs)

Figure 12:
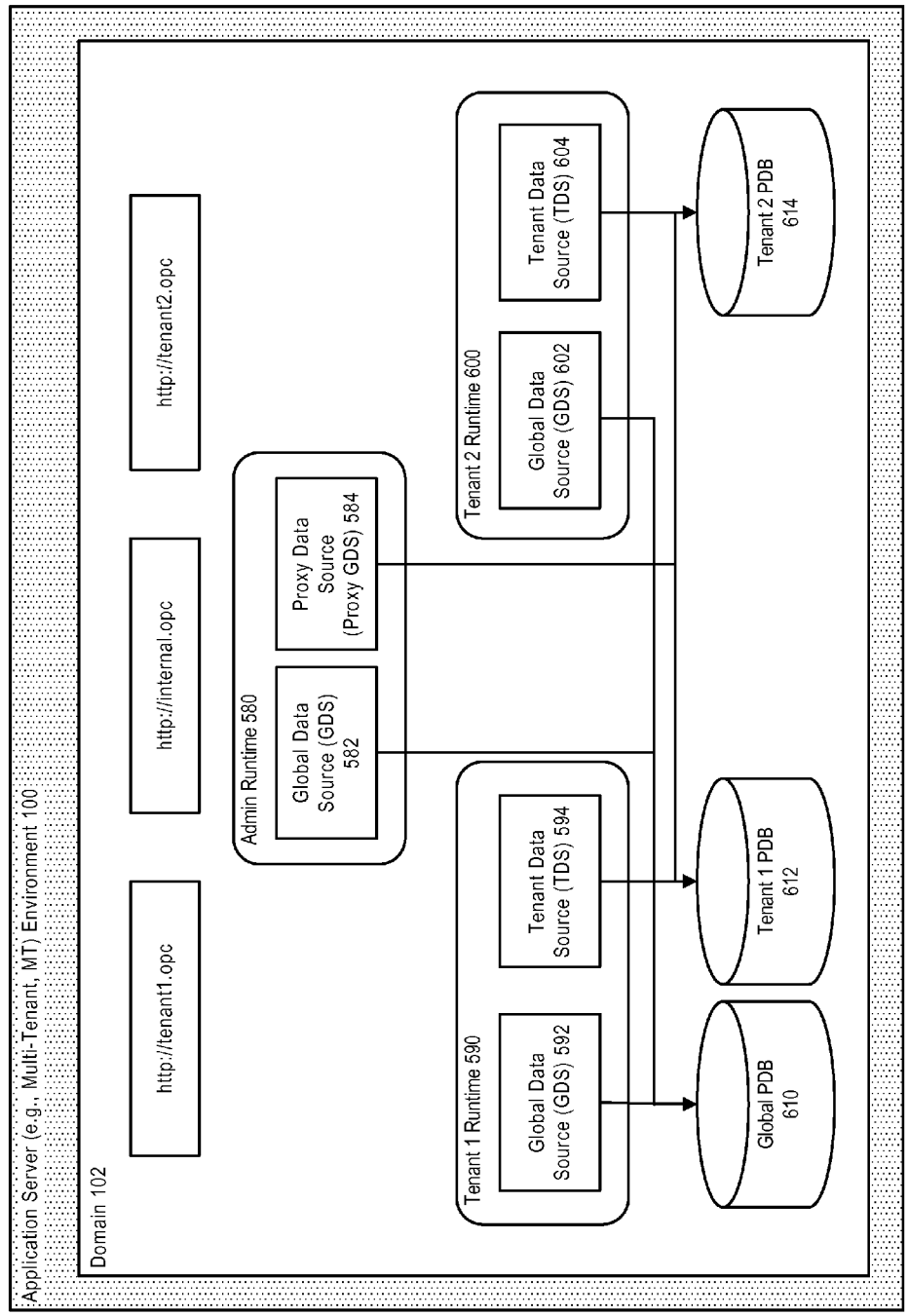
FIG. 12 further illustrates tenant onboarding in a multitenant application server environment, in accordance with an embodiment.

FIG. 12 further illustrates tenant onboarding in a multi-tenant application server environment, in accordance with an embodiment.

As illustrated in FIG. 12, in accordance with an embodiment, the runtime view of FA-MT includes an admin runtime 580, which in turn provides access to one or more global data sources 582 or proxy data sources 584, a plurality of tenant runtimes 590, 600, each with their own global data source 592, 602, and tenant data source 594, 604, a global PDB 610 and several tenant PDBs 612, 614. Each of these component can be made accessible to upper stack components via a plurality of URIs, for example http://tenant1.opc, http://tenant2.opc, and http://internal.opc.

In accordance with various embodiments, there are several different usages of tenancy in FAMT runtime, a few examples of which are described below: used by MetaDataService to select the tenant database partition to use to pick tenant-specific customization of some metadata.

For example, it can be used by OPSS to select the tenant database partition to pick security policies that need to be enforced. It can also be used by Audit Service to determine the audit policy for a tenant and select the tenant database partition to store the audit log. In all such cases, there is a need for the correct tenancy to be associated with the thread of execution before the shared service is invoked.

When tenancy context is not explicitly set, it is derived from the current partition context of the thread as described below: When a request enters WLS, an appropriate container determines various details of the request's target component, and creates a ComponentInvocationContext object to represent the invocation. Similarly, when WLS invokes a callback object as part of some asynchronous operation like timer expiration, it sets the correct invocation context in the thread. As part of ComponentInvocationContext, partition information is also maintained. The onboarding process described above provides the necessary mapping for the current partition to the current tenant value which is available via the tenancy context.

Global Tenancy

Typically, the system's administration code usually has a need to run in the context of an MT Administrator who represents all tenants. In accordance with an embodiment, this special state is represented by a special tenant ID called "GLOBAL", which is different from the null tenant ID that indicates there is no tenant context associated with the current request.

Any software code that wants to use GLOBAL Database must maintain a fixed reference to a DataSource that always connects to GLOBAL Database. Code running in the GLOBAL runtime does not have a fixed binding to a particular tenant DB, but instead accesses the data from a tenant DB that is dependent on the operational context. Since tenant DBs are not pre-provisioned in the system, a proxy data source (e.g., ProxyDataSource) can be used, in which the code can continue to have a fixed JNDI reference to the proxy data source, which selects a particular underlying DB based on the current tenant context.

There are two distinct use cases requiring FMW/FA code to run outside WLS as described below: Certain life cycle operations and administrative operations happen in Java SE environment. As part of business process management, the server code sometimes fork a long running Java process that's working on a specific tenant's context.

Having a single reference to a proxy data source which is made available via JNDI and the proxy data source takes care of delegating the calls to appropriate underlying database using tenancy context. For the above to work, the tenancy context must be set correctly in the thread in Java SE process. The Java SE process must be launched by passing in the GLOBAL tenant context using the system properties for tenant name and tenant id. The forked Java process uses this information and calls switchTenantContext to establish the tenancy context in the thread of execution.

Global Tenancy Check in Java SE

In accordance with an embodiment, in order to be able to executeAs, the system must ensure that the current tenant context is Global. This can be done by checking that for a current tenant context, that the tenant ID is equal to 0.

Figure 13:
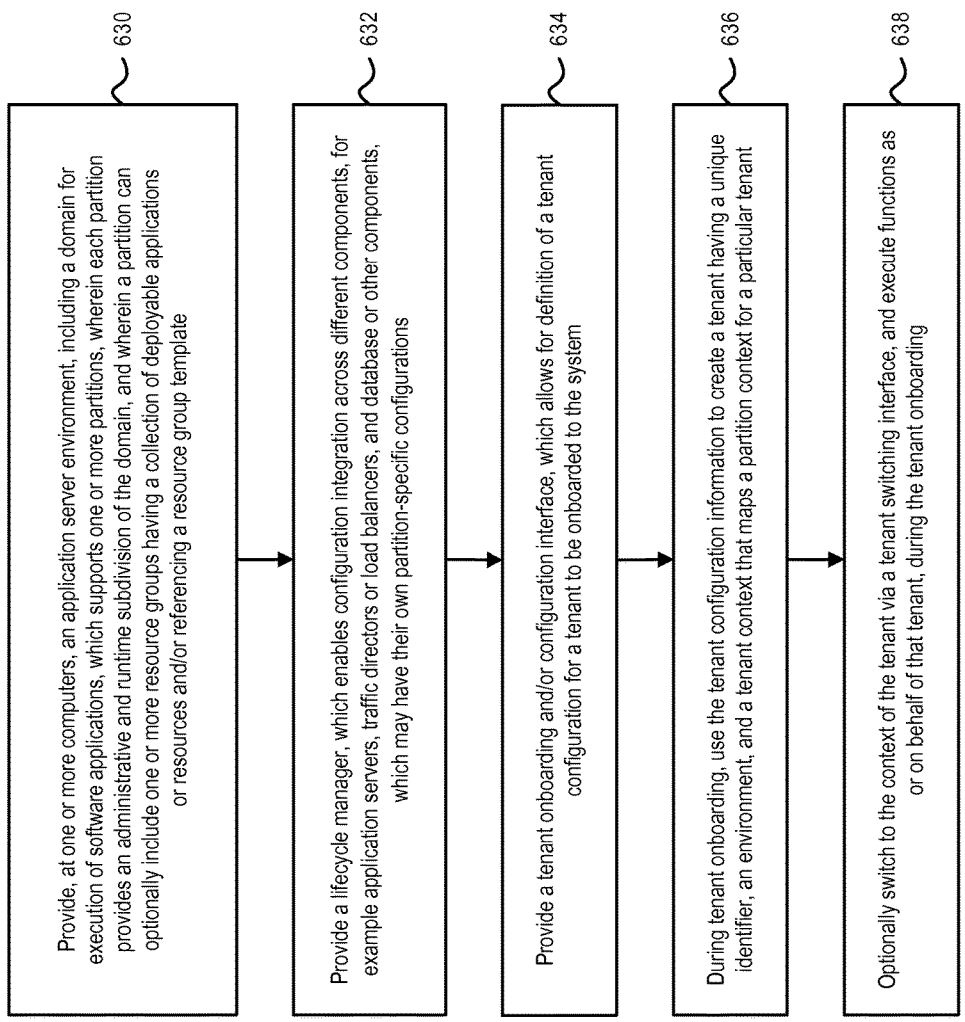
FIG. 13 illustrates a flowchart of method for providing tenant onboarding in a multitenant application server environment, in accordance with an embodiment.

FIG. 13 illustrates a flowchart of method for providing tenant onboarding in a multitenant application server environment, in accordance with an embodiment.

As illustrated in FIG. 13, at step 630, an application server environment is provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 632, a lifecycle manager is provided, which enables configuration integration across different components, for example application servers, traffic directors or load balancers, and database or other components, which may have their own partition-specific configurations.

At step 634, a tenant onboarding and/or configuration interface are provided, which allows for definition of a tenant configuration for a tenant to be onboarded to the system.

At step 636, during tenant onboarding, the system uses the tenant configuration information to create a tenant having a unique identifier, an environment, and a tenant context that maps a partition context for a particular tenant.

At step 638, the system can optionally switch to the context of the tenant via a tenant switching interface, and execute functions as or on behalf of that tenant, during the tenant onboarding.

Component Lifecycle Plugins

In accordance with an embodiment, the end-to-end lifecycle infrastructure includes a plugin-based mechanism which enables the different components within a multi-tenant application server environment to use a lifecycle plugin to provide their own component-specific lifecycle functionality.

Figure 14:
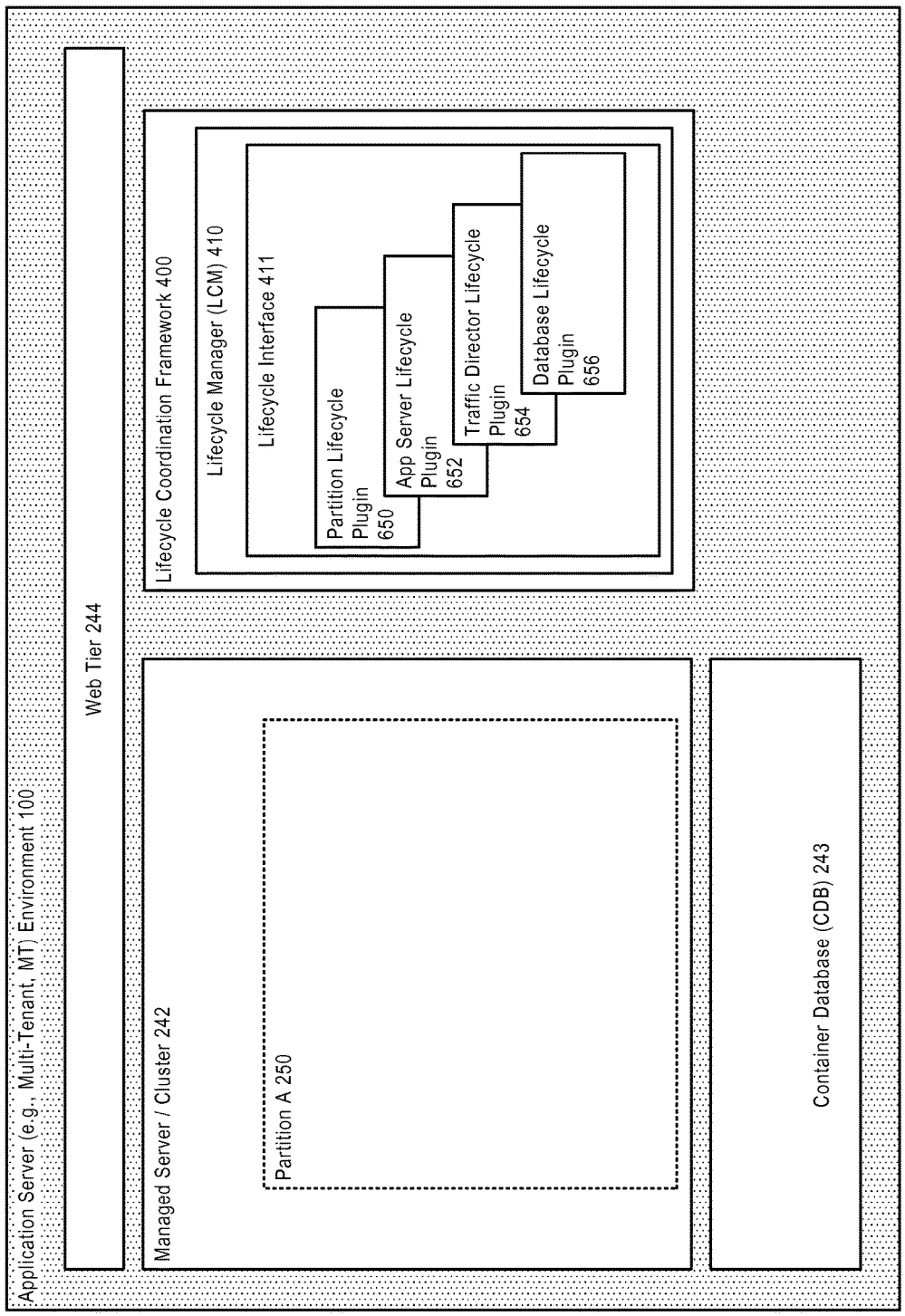
FIG. 14 illustrates lifecycle plugins in a multitenant application server environment, in accordance with an embodiment.

FIG. 14 illustrates lifecycle plugins in a multitenant application server environment, in accordance with an embodiment.

As described above, in accordance with an embodiment, the system can include a lifecycle coordination framework, including a lifecycle manager (LCM) and lifecycle interface, which enables lifecycle management of the partition and other components, such as a traffic director component, database component, or other components.

For example, as illustrated in FIG. 14, the lifecycle interface can support the use of a partition lifecycle plugin 650, an application server lifecycle plugin 652, a traffic director lifecycle plugin 654, and a database lifecycle plugin 656, or other types of plugin.

Each lifecycle plugin can encapsulate the lifecycle needs for, for example, an application server, e.g., WebLogic, WLS; or traffic director or other load balancer, e.g., Oracle Traffic Director, OTD instance lifecycle. The lifecycle interface provides a common or generic process for each plugin to manage the lifecycle of its given component.

Figure 15:
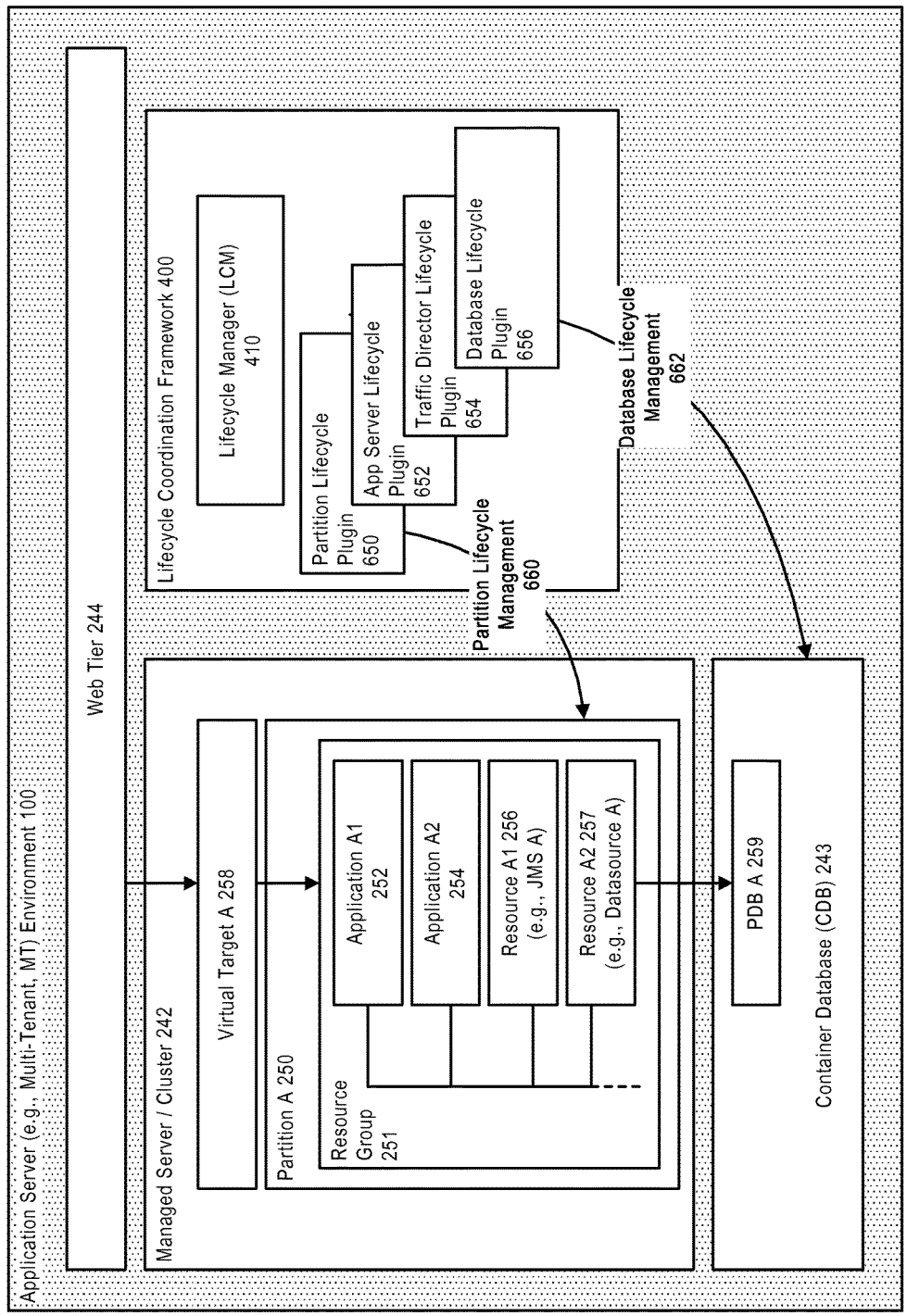
FIG. 15 further illustrates lifecycle plugins in a multitenant application server environment, in accordance with an embodiment.

FIG. 15 further illustrates lifecycle plugins in a multi-tenant application server environment, in accordance with an embodiment.

As illustrated in FIG. 15, the lifecycle plugins can contribute to a partition lifecycle management 660, or a database lifecycle management, 662.

For example, an OTD instance can request the lifecycle manager to create a WLS runtime, for use in creating a partition on a particular domain. The lifecycle manager delegates to each plugins create method, in effect providing an indication of the domain, and requesting the plugin to create a partition on that domain.

In accordance with various embodiments, similar plugin functionality can be provided to support, e.g., other database, traffic director, or other components, and to create, delete, stop, start, quiesce, migrate servers where available. Each plugin can be implemented for each component supported through the lifecycle manager.

A. Application Server Plugin

In accordance with an embodiment, the system can include an application server (e.g., WebLogic, WLS) lifecycle plugin implements the lifecycle APIs and manages the creation or configuration of application server (e.g., WLS) partitions.

Interaction with Lifecycle Manager

In accordance with an embodiment, the application server plugin can be registered with the lifecycle manager using a register-plugin operation. Subsequently, upon registration of an application server (e.g., WLS) runtime with the lifecycle manager, the client interacting with lifecycle manager can make a REST call to the lifecycle manager to create/update/delete partition on the specified runtime registered with lifecycle manager. The application server (e.g., WLS) plugin can then be invoked to perform lifecycle operations on that particular application server (e.g., WLS) runtime.

Communication with the Application Server

In accordance with an embodiment, the application server plugin can use JMX/REST APIs exposed by the application server (e.g., WLS) to interact with the server. The plugin can implement the partition plugin contract from lifecycle manager to allow lifecycle operations on targeted application server runtimes to do CRUD operation on application server partitions. Following are some exemplary operations which can be done on a, e.g., WLS runtime for partitions:

| Lifecycle Operation | Description | Contract implemented by App Server Plugin |
| --- | --- | --- |
| createPartition | Creates WLS partition based on information provided in lifecycle context | public abstract LifecyclePartition create(String partitionName, LifecycleContext ctx, LifecycleRuntime runtime) throws LifecycleException; |
| updatePartition | Updates WLS partition based on information provided in lifecycle context | public abstract LifecyclePartition update (String partitionName, LifecycleContext ctx, LifecycleRuntime runtime) throws LifecycleException; |
| deletePartition | Deletes WLS partition based on information provided in lifecycle context | public abstract void delete(String partitionName, LifecycleContext ctx, LifecycleRuntime runtime) throws LifecycleException; |
| associatePartition | Associates WLS partition with a partition of other Type. [Example of other Type being OTD, database, etc] | public abstract void associate(LifecycleContext partition1Ctx, LifecycleContext partition2Ctx, LifecyclePartition partition1, LifecyclePartition partition2,LifecycleRuntime runtime) throws LifecycleException; |
| dissociatePartition | Dissociate WLS partition from a partition of otherType. | public abstract void dissociate(LifecycleContext partition1Ctx, LifecycleContext partition2Ctx, LifecyclePartition partition1, LifecyclePartition partition2,LifecycleRuntime runtime) throws LifecycleException; |

| Lifecycle Operation | Description | Contract implemented by App Server Plugin |
|---|---|---|
| migratePartition | Migrates WLS partition to the newly available targets | public abstract LifecyclePartition migrate (String partitionName, LifecycleContext ctx, LifecycleRuntime runtime) throws LifecycleException; |

In accordance with an embodiment, the application server plugin can implement the runtime plugin contract from the lifecycle manager to allow lifecycle operations on targeted application server (e.g., WLS) runtimes, for example:

| Runtime Operation | Description | Contract implemented by App Server Plugin |
|---|---|---|
| scaleup | Scales up weblogic server instance present in the pre-configured dynamic cluster in this weblogic domain | public abstract void scaleUp(String runtimeName, int scaleFactor, LifecycleContext ctx) throws LifecycleException; |
| scaledown | Scales down weblogic server instance present in the pre-configured dynamic cluster in this weblogic domain | public abstract void scaleDown(String runtimeName, int scaleFactor, LifecycleContext ctx) throws LifecycleException; |
| quiesce | Quiesces a weblogic server instance | public abstract void quiesce(String runtimeName, LifecycleContext ctx) throws LifecycleException; |

Runtime Properties for Lifecycle Operations on Partitions

In accordance with an embodiment, the application server plugin uses the following properties to connect to an application server, e.g., WLS runtime. These properties are passed on to the lifecycle operation via lifecycle runtime object as specified in the contract above:

Properties
runtimeProperties=runtime.getRuntimeProperties( );

| Property | Description | Property key |
|---|---|---|
| Host | Weblogic host | runtimeProperties.getProperty("hostname") |
| Port | Weblogic port | runtimeProperties.getProperty("port") |
| username | Admin username | runtimeProperties.getProperty("username") |
| password | Admin password | runtimeProperties.getProperty("password") |

Lifecycle Context for WLS Plugin

In accordance with an embodiment, any CRUD operation done using an application server plugin can be customized based on the information/data provided to the plugin in the lifecycle context. The client can specify the properties as part of REST call. The lifecycle manager populates the data into the lifecycle context and passes the property back to the plugin. For example, when a client makes a REST call for createPartition for WLS partition, they can specify the properties to specify the attributes of partition.

Lifecycle Context for Create/Update Partition

In accordance with an embodiment, following are some exemplary properties which can be specified by the client while create/update partition operation. These configurations are created as part of partition creation/update and are specific to the partition:

| Property | Description |
|---|---|
| resourcegroup | Resource group Name. |
| resourcegrouptemplate | Resource group template. Assumption is the resource group template specified should be existing in the domain. |
| partitionPDBinfo | Pluggable database name for this partition. |
| datasource | datasource name for this specific PDB. |
| url | url for this specific PDB. |
| username | username for this specific PDB. |
| password | password for this specific PDB. |
| partitionproperty | partition property key/name. |
| partitionpropertyvalue | partition property value. |

In accordance with an embodiment, following are some exemplary properties which can be specified by the client while create/update partition. Failure to find these entities in the application server (e.g., WLS) Server would result in exception being thrown from the application server plugin:

| Property | Description |
|---|---|
| resourcegroup:target | Target to be associated with this resourcegroup. [Comma separated list of targets] |
| securityrealm | Security realm to be associated with this partition |
| partition:defaulttarget | Comma separated list of targets |
| partition:availabletarget | Available targets [Comma separated list of targets] |

Lifecycle Context for Delete Partition

In accordance with an embodiment, no additional property other than partition name is needed to delete an application server (e.g., WLS) partition.

Lifecycle Context for Associate Partition

In accordance with an embodiment, association of an application server instance with another component may involve updating the application server (e.g., WLS) partition with some new properties, or may involve providing the necessary properties to the other component for association.

Any component which wants to participate in association needs to make sure to pass in the correct set of properties in lifecycle context in the format specified above.

In the case of WLS-OTD association, in this case, the OTD partition expects the cluster-name, cluster-members and target information to do the association. The application server plugin makes a JMX/REST call to the application server runtime to fetch the correct targeting information based on the partition name. These properties are added to the application server's lifecycleContext as part of associatePartition implementation. As part of an association call to the plugin, a complete snapshot of target configuration will be added to the lifecycle context. Then, the lifecycle manager calls the associatePartition implementation of OTD plugin, which uses the lifecycle context (which has the properties of WLS targets) to do the wiring of origin server pool and the application server partition.

In accordance with an embodiment, when an application server (e.g., WLS) partition is associated with an OTD partition, and if the partition is targeted to a configured cluster, if server is no running then the lifecycle manager will get configuration information available for Server's ListenAddress and Port and send it to OTD. If servers are running, then we will get the runtime information for Server available from RuntimeMBean and pass that to OTD via context information.

In a dynamic cluster, there is no configuration information available for ListenAddress, although the configuration time information is available for ports for dynamic servers. If dynamic servers are not running when an associate call happens then the lifecycle manager will get the configured port and the node manager's ListenAddress (if dynamic servers are associated with a machine) and send this to other plugins. If dynamic servers are running when associate call happens then the lifecycle manager will get the server listen address and port from runtime Mbean and send it to the OTD plugins.

In the case of WLS-DB Association, in this case, the application server (e.g., WLS) plugin's associatePartition method uses the DB Partition's lifecycleContext to populate PDB Info and update the WLS partition with the PDB info.

Lifecycle Context for Dissociate Partition

In accordance with an embodiment, dissociation of the application server (e.g., WLS) with another component may involve removing/updating certain WLS partition configuration. Any component which wants to participate in dissociation needs to make sure to pass in the correct set of properties in lifecycle context in the format specified above. Following is an example which explains dissociation between WLS and DB partitions.

WLS-DB Dissociation: In this case, the WLS plugin's dissociatePartition method uses the DB partition's lifecycleContext to populate PDB Info name and update the WLS partition by removing the PDB info. The WLS plugin expects the PDB Info name in the lifecycleContext.

WLS-OTD Dissociation: In this case, the OTD partition expects the cluster-name, cluster-members and target information to do the dissociation. WLS plugin makes JMX/REST call to the WLS runtime to fetch the correct targeting information based on the partition name. These properties are added to the WLS's lifecycleContext as part of dissociatePartition implementation of WLS plugin.

WLS Partition Configuration Discovery and Association in an LCM Environment

In accordance with an embodiment, the partition configuration may be created/updated/deleted outside of the lifecycle manager environment/scope. For example, an Administrator might invoke WLST command to create a partition, or use a WLS admin console to update a partition. In any circumstance, it needs to be made sure that the partition information present with the lifecycle manager is recent and the most updated one.

Effect of Lifecycle Manager Runtime Scaling on Application Server Configurations In accordance with an embodiment, a ScaleUp and scaleDown operation in the application server (e.g., WLS) plugin can be used to provide the functionality of starting and stopping the server instances which are part of the dynamic cluster. The WLS plugin might use node manager to interact with the machines/servers to start/stop the servers.

Elasticity frameworks can make a scale up or scale down call to lifecycle manager with the cluster information, scale factor, runtime type (i.e. WLS) Interceptors which are registered with the scaleUp/scaleDown are invoked before the scaleup/scaledown operation to validate and perform the necessary infrastructure needed for the cluster to scale up.

For example, to make the necessary calls to WLS runtime to determine/create the number of datasources needed for the new servers to be brought up in the cluster. Once the pre-requisites to scaleup/scaledown the cluster is satisfied (i.e., any pre-invoke of the interceptors is satisfied), the real scaleup or scale down happens. The interceptors are called again after the operation has completed in the plugin to satisfy the post-invoke requirements.

For example, assuming that a number of interceptors will be used in order to scale a WLS cluster, described below is one such sequence.

Assume that the following interceptors have been added: WLS Interceptor, OTD Interceptor, JMS Interceptor, DataSource Interceptor when WLSScaleDownAction from Elasticity module calls lcm.scaleDown(clusterName, factor, payload): 1. WLS Interceptor checks if scaling will be within cluster limits. It then calls ctx.proceed( ); 2. OTD Interceptor will make the necessary OTD config changes to mark the selected targets to be drained. OTD Interceptor will wait till OTD metrics indicate that the requests have been drained. It then calls ctx.proceed( ); 3. JMS Interceptor will wait for the JMS backlogs to drain. It then calls ctx.proceed( ); 4. DataSource Interceptor will ensure that all JDBC Connections have been returned to the pool. It then calls ctx.proceed( ); 5. The service is scaled down (called by ElasticServiceManager after the last interceptor).

On the return path of Interceptor call chain: 1. DataSourceInterceptor will increase the max-connection-pool-size appropriately for the remaining alive managed servers; 2. JMS Interceptor does nothing; 3. OTD Interceptor does nothing; 4. WLS Interceptor does nothing.

Invocation of Application Sever Plugin Using REST Requests

In accordance with an embodiment, lifecycle manager clients can use REST requests to do operations on the WLS, including for example: 1. Register a WLS runtime and the properties to be passed in the REST request; 2. Create empty WLS partition; 3. Create WLS partition with resource group and targeting; 4. Add WLS Partition to environment (assuming environment test1 is already created); 5. Associate WLS Partition with another partition; 6. Dissociate WLS Partition with another partition; 6. Delete WLS Partition; 7. Update WLS Partition.

B. Database Plugin

In accordance with an embodiment, the system can include a database (e.g., an Oracle Database) lifecycle plugin which implements the lifecycle APIs and manages the creation or configuration of database (e.g., Database) partitions.

In accordance with an embodiment, the multitenant-aware architecture of a database component such as the Oracle Database enables it to function as a multitenant container database (CDB) that includes customer-created pluggable databases (PDBs). Each PDB acts as a portable collection of schemas, schema objects, and nonschema objects. From the perspective of the lifecycle manager module, the database component manages its own partition configuration using the PDB features built into the database machinery. The database lifecycle plugin can leverage this functionality to perform PDB management operations when called upon by the lifecycle manager.

Interaction with Lifecycle Manager

In accordance with an embodiment, the database plugin is an implementation of the lifecycle manager partition plugin interface, and is registered with lifecycle manager before it can perform any operations. Subsequently, upon registration of a database runtime with the lifecycle manager, the client interacting with lifecycle manager would make a REST call to the lifecycle manager to perform PDB operations on the specified runtime registered with lifecycle manager.

Runtime Registration

In accordance with an embodiment, before an operation can be performed on a database, it has to be registered with the lifecycle manager. The registration process requires information which is used to connect to the database. For example, a database runtime can be registered with the following properties:

| Name | Description |
|---|---|
| connectionURL | URL to connect to the database. |
| username | User that has administrative privileges to perform PDB management operations on the database. |
| password | Password for the database user. |

Lifecycle Operations on the Database

In accordance with an embodiment, the database lifecycle plugin communicates with the database using a remote SQL connection via JDBC. Properties specified during the runtime registration are used to connect to the database. A number of lifecycle operations map to corresponding SQL commands, various clauses of which are determined from the properties passed on in the lifecycle context object, and passed to the plugin, for example:

| Lifecycle partition Operation | Plugin Operation |
|---|---|
| create | Execute the CREATE PLUGGABLE DATABASE SQL Command |
| delete | Execute the DROP PLUGGABLE DATABASE SQL Command |
| update | Execute the ALTER PLUGGABLE DATABASE SQL Command |
| associate | Associate the database partition with a WLS partition |
| quiesce | Execute the ALTER PLUGGABLE DATABASE CLOSE command |
| start | Execute the ALTER PLUGGABLE DATABASE OPEN command |

In accordance with an embodiment, the following are details of the above operations, with examples:

Create

In accordance with an embodiment, the create operation performs the following tasks: (1) Create a pluggable database on the specified database runtime. The partition ID of the newly created PDB is obtained from the V$PDBS table. The partition name is the same as the PDB name; (2) Optionally, create a database user; (3) Optionally, create a CDB plan directive for the PDB using an existing CDB plan. A number of options are available for the above tasks. These options are passed as properties in the lifecycle context object to the plugin.

Delete

In accordance with an embodiment, the delete operation can perform the following tasks: (1) drop the pluggable database, using the PDB name. PDB users will also be dropped automatically; (2) Optionally, drop CDB plan directive for the PDB Sample SQL executed by the plugin for above tasks:

Update

In accordance with an embodiment, the update operation modifies the attributes of a pluggable database, by executing an ALTER PLUGGABLE DATABASE command to perform the updates to the PDB.

Associate

In accordance with an embodiment, the associate operation is relevant when a WLS partition is associated with a PDB. The database plugin passes on the database connection URL to the WLS plugin, during association. If a user was created while creating the PDB by lifecycle manager, then the username and password of that user is also passed to the WLS partition plugin.

Quiesce

In accordance with an embodiment, the quiesce operation closes the specified PDB using the ALTER PLUGGABLE DATABASE command.

Start

In accordance with an embodiment, the start operation starts the specified PDB using the ALTER PLUGGABLE DATABASE command.

Lifecycle Context Schema

In accordance with an embodiment, various SQL clauses can be formed from properties passed to the plugin via a lifecycle context object. Some of the common properties include the following:

| Property | Description |
|---|---|
| name | Name of the pluggable database. |
| admin user | User name for the PDB. |
| identified by | Password for the PDB admin user. |
| storage | STORAGE clause for the SQL statement creating the PDB. |
| default tablespace | DEFAULT TABLESPACE clause for the SQL statement creating the PDB. |
| file_name_convert | FILE_NAME_CONVERT clause for the SQL statement creating the PDB. |
| tempfile_reuse | TEMPFILE_REUSE clause for the SQL statement creating the PDB. |
| roles | ROLES clause for the SQL statement creating the PDB. |
| from | FROM clause for the SQL statement creating the PDB. This is used when cloning a PDB. |

In accordance with an embodiment, the SQL commands and various clauses can be specified as lifecycle context properties. Depending on support in the database, most of these can be used when altering the PDB as well.

Resource Manager Properties

In accordance with an embodiment, when creating a PDB, a CDB plan directive can also be created. Properties related to this should be specified under the key "resourceManager". Following are exemplary properties for the "resourceManager"

| Property | Description |
| --- | --- |
| plan | Name of the existing CDB plan. This is required. |
| shares | Specifies the share of resource allocation for the pluggable database. |
| utilization_limit | Specifies the maximum percentage of CPU that the pluggable database can utilize. |
| parallel_server_limit | Specifies the maximum percentage of parallel servers that the pluggable database can use. |

User Properties

In accordance with an embodiment, when creating a PDB, a user can also be created. The properties related to the user should be specified under the key "databaseUser".

Figure 16:
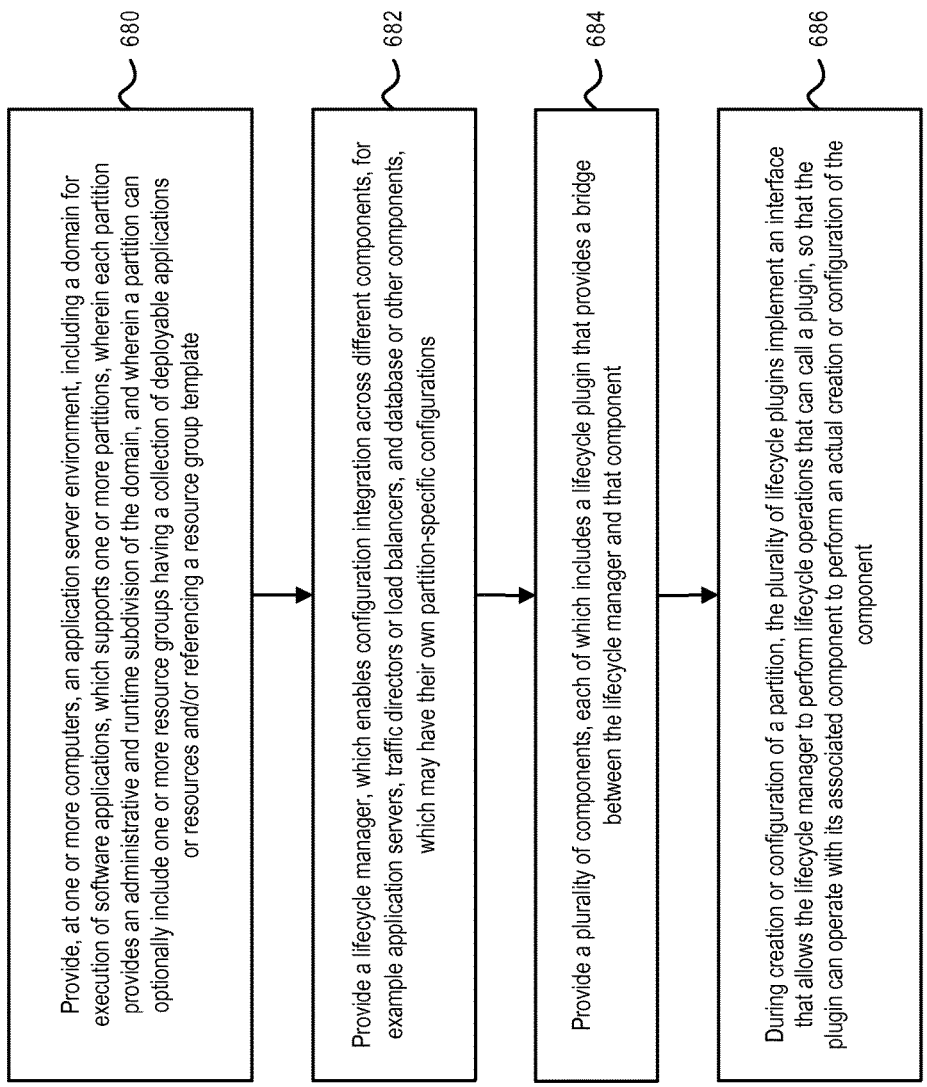
FIG. 16 illustrates a flowchart of method for supporting lifecycle plugins in a multitenant application server environment, in accordance with an embodiment.

FIG. 16 illustrates a flowchart of method for supporting lifecycle plugins in a multitenant application server environment, in accordance with an embodiment.

As illustrated in FIG. 16, at step 680, an application server environment is provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 682, a lifecycle manager is provided, which enables configuration integration across different components, for example application servers, traffic directors or load balancers, and database or other components, which may have their own partition-specific configurations.

At step 684, a plurality of components are provided, each of which includes a lifecycle plugin that provides a bridge between the lifecycle manager and that component.

At step 686, during creation or configuration of a partition, the plurality of lifecycle plugins implement an interface that allows the lifecycle manager to perform lifecycle operations that can call a plugin, so that the plugin can operate with its associated component to perform an actual creation or configuration of the component.

Global Runtime

In accordance with an embodiment, the system supports the use of a global runtime within the multi-tenant application server environment.

As described above, in accordance with various embodiments, such as those that use Fusion Apps or Fusion Middleware, there may be requirements for running things in a global context for all partitions.

For example in a Metadata Services (MDS) component which is provided as part of Fusion Middleware (FMW), there is a requirement that there be one global cache for all of the shared documents and then partition specific caches for the customizations that are specific to the tenants. In addition to having such a global cache, there is also the requirement for notifying all the partitions when the cache has been purged or updated, so that the MDS instance running in the partitions can apply the customizations on the updated cache.

Additionally, at a high level in a multi-tenant environment there may be artifacts or other components that need to be shared across the entire domain, including any partitions, referred to herein as global artifacts. These artifacts reside or run at the global or domain level in a multitenant container which is referred as the global runtime. The partition specific artifacts or components are the ones that are reside or run in the context of a partition.

In accordance with an embodiment, the global runtime does not run in any specific partition, but is instead scoped to a domain. When running in, for example, a Java Required Files (JRF) domain, with the tenant mapping for Fusion Applications (FA) and multi-tenancy flag enabled, code running in the global runtime can switch to the context of a tenant and execute something on behalf of a tenant via a tenant switching (e.g., switchTenant) API.

In accordance with an embodiment, one or more resource groups can also be specified at the domain level for use in the global runtime. Targeting of domain-level resource groups is set at the resource group, not at the individual resources within the resource group. All resources in the group will be targeted to all targets specified for the resource group. When targeted to a cluster, the applications run on all the managed servers in the cluster.

In accordance with an embodiment, at the domain level the resource group is a convenient way to group related resources. The system manages the resources declared in a domain-level resource group the same as ungrouped resources: for example, they are started during system start-up and stopped during system shut-down. Further, an administrator can stop, start, or remove any single resource in a group individually and can also act on all the resources in a group implicitly by operating on the group.

For example, stopping the group stops all the resources in the group that are not already stopped. Starting the group starts any resources in the group that are not already started. Removing the group removes all the resources contained in the group.

In accordance with an embodiment, the global runtime resource group(s) must be started before all the other resource groups defined in partition(s). This allows the global runtime to be initialized before any of the partitions and, if necessary to load shared classes using the shared class loader to share among partitions or other applications/resource groups it can do so before initializing the partitions.

In accordance with an embodiment, when running in the global runtime, the partition name will return GLOBAL, and the id will be 0.

When running in a JRF domain with the multi-tenancy flag enabled, the tenant context will be have tenancy set as GLOBAL, and the tenant id will also be 0.

In accordance with an embodiment, resource groups defined at the global runtime must be targeted to the same managed servers/clusters as the partitions that applications running in the global runtime may want to operate upon or share classes with. When migrating a partition (resource groups) from one cluster to another, the global runtime must either be running on the global runtime where the partition is being migrated, or, the migration feature must ensure that the resource groups defined at the global runtime are migrated prior to migrating the resource group of a partition.

Figure 17:
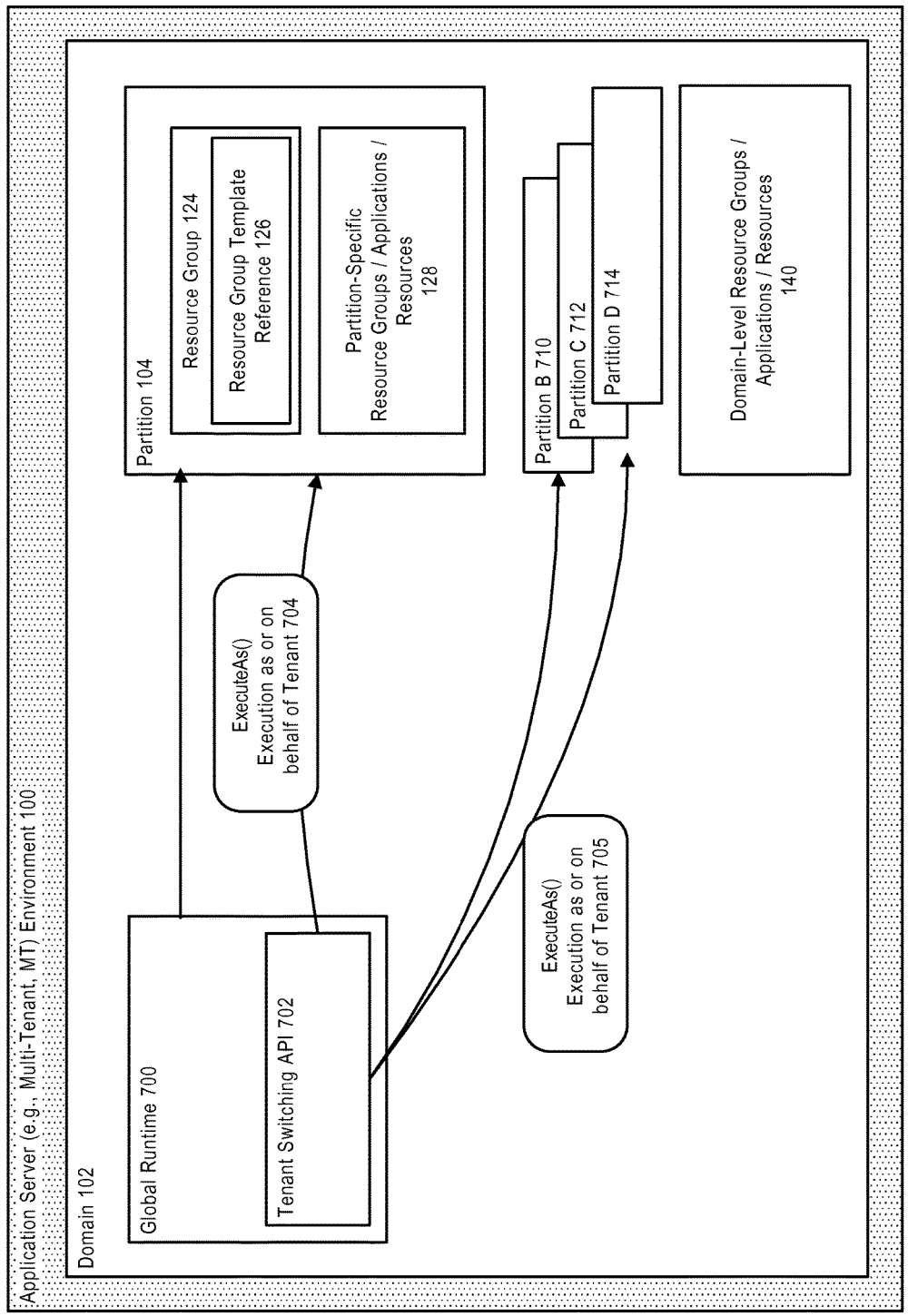
FIG. 17 illustrates use of a global runtime in a multitenant application server environment, in accordance with an embodiment.

FIG. 17 illustrates use of a global runtime in a multitenant application server environment, in accordance with an embodiment.

In accordance with an embodiment, the global runtime can be used for those applications which are intended to run at the domain level. If a particular component or application wants to use executeAs, it must run at the domain level in the global runtime, wherein the global runtime is the same as or acts as the domain runtime.

In accordance with an embodiment, the ExecuteAs and tenant onboarding are provided as a JRF type functionality, for upper stack usage. An application running in the global runtime can be seen by the various partitions depending on the security settings afforded those partitions. Similarly, an application running at the domain (global) level with its own UUID can be made available to the partitions.

For example, a global PDB can be shared across tenants, wherein the global PDB is set up by the upper stack, which is a common configuration setup used with SaaS usecases, and not as commonly with consolidation or PaaS use cases.

As illustrated in FIG. 17, in accordance with an embodiment, the global runtime 700 can include one or more applications, and can use a tenant switching API 702 to perform an executeAs operation 704, 705 on behalf of a tenant, to access or operate on behalf of, one or more partitions 710, 712, 714.

In Fusion Apps and Fusion Middleware scenarios there are requirements for running things in the global context for all Partitions. For example, as described above in the context of Metadata Services (MDS), there is a requirement that there be one global cache for all the shared documents and then partition specific caches for the customizations that are specific to the tenants; and also that all of the partitions be notified when the cache has been purged or updated so that the MDS instance running in the partitions can apply the customizations on the updated cache.

Partition and Tenant Name and ID

As described above, in accordance with an embodiment, when running in the global runtime, the partition name will return GLOBAL, and the ID will be 0. When running in a JRF domain with the multitenancy flag enabled, the tenant context will be have tenancy set as GLOBAL, and the tenant ID will also be 0.

Migration and Global Runtime

As described above, in accordance with an embodiment, resource groups defined at the global runtime must be targeted to the same managed servers/clusters, since the partitions that applications running in the global runtime may want to operate upon or share classes with.

In accordance with an embodiment, when migrating a partition (or its resource groups) from one cluster to another, the global runtime must either be running on the cluster where the partition is being migrated, or, the migration feature must ensure that the resource groups defined at the global runtime are migrated prior to migrating the resource group of a partition.

SaaS Scenario Example

The example below shows use of resource group at the domain level in the SaaS scenario where a Customer Relationship Management (CRM) application is deployed to the global runtime. The resource group template defined at the domain level can be used by both the global runtime as well as partitions. For readability, the example below shows just the resource group at the domain level:

```
<domain>
<resource-group-template>
<name>CRMResourceGroupTemplate</name>
<app-deployment>
<name>CRM</name>
...
</app-deployment>
<app-deployment>
<name>physician</name>
...
</app-deployment>
<app-deployment>
<name>browser-starter</name>
...
</app-deployment>
<app-deployment>
<name>SamplesSearchWebApp</name>
...
</app-deployment>
<jms-server>
<name>CRMJMSServer</name>
</jms-server>
<mail-session>
<name>mail/CRMMailSession</name>
<jndi-name>mail/CRMMailSession</jndi-name>
<properties>mail.user=joe;mail.host=mail.mycompany.com</properties>
</mail-session>
<jms-system-resource>
<name>CRM-jms</name>
<sub-deployment>
<name>CRMJMSServer</name>
</sub-deployment>
<descriptor-file-name>jms/CRM-jms.xml</descriptor-file-name>
</jms-system-resource>
<jdbc-system-resource>
<name>CRMGlobalDataSourceXA</name>
<descriptor-file-name>jdbc/CRMGlobalDataSourceXA-9669-jdbc.xml</descriptor-file-name
</jdbc-system-resource>
<saf-agent>
<name>WsrmAgent</name>
<service-type>Both</service-type>
</saf-agent>
</resource-group-template>
<resource-group>
```

```
<name>CRM</name>
<resource-group-template>CRMResourceGroupTemplate</resource-group-template>
</resource-group>
</domain>
```

In accordance with an embodiment, applications and shared libraries can be deployed to a resource group at the domain level as well.

Global PDB and Tenant-Specific PDB

In accordance with an embodiment, when running, e.g., an Oracle 12c Database, many PDBs can run in one container database (CDB). With the creation of a partition for a tenant, a PDB will be created and the data source configured for the partition to use.

In accordance with an embodiment, in addition to the tenant-specific PDB there can optionally be a global PDB that is shared across all tenants. For example, the metadata (documents) in MDS can be stored in a global PDB and the tenant-specific customizations in the tenant-specific PDBs.

In accordance with an embodiment, in order to be able to use the shared data from the global PDB, the partitions need access to both the PDBs (global and tenant-specific). Each partition can be configured with an additional, read only data source to the global PDB to be able to access the shared data, and also a data source to the tenant-specific PDB that will be used to store tenant-specific data. The shared application code that is running in the global runtime will be able to write to the global PDB and will be configured with a read/write data source to the global PDB.

Figure 18:
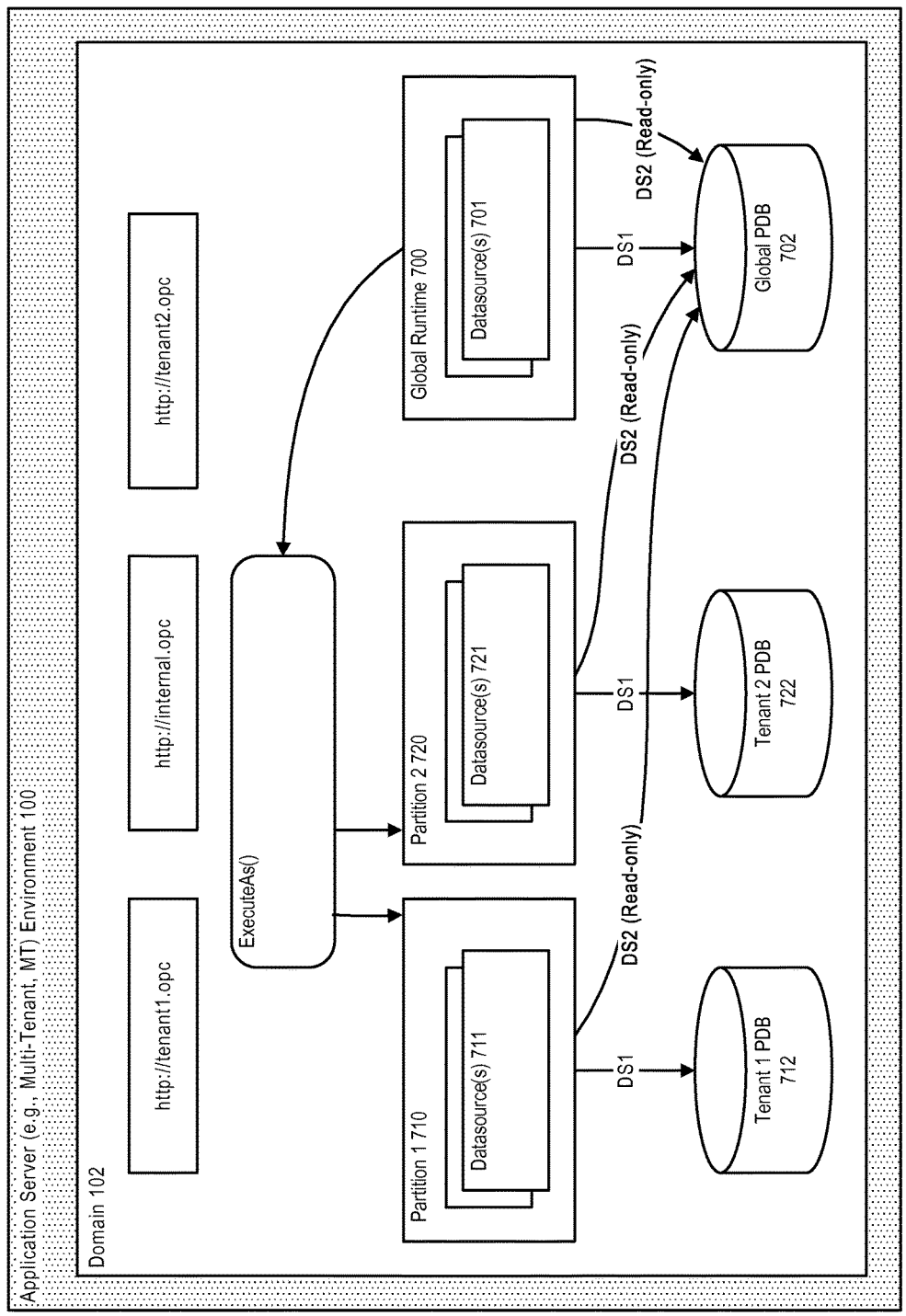
FIG. 18 further illustrates use of a global runtime in a multitenant application server environment, in accordance with an embodiment.

FIG. 18 further illustrates use of a global runtime in a multitenant application server environment, in accordance with an embodiment.

As illustrated in FIG. 18, in accordance with an embodiment, each partition can be configured with one or more data sources 701, 711, 721, including, for example, that the global runtime has access to the global PDB 702 via data source DS2.

As further illustrated in FIG. 18, the tenants that run in Partition 1 (710) and Partition 2 (720) have read/write access via DS1 to their specific PDBs (712, 722 respectively) and a read only DS2 (same data source shared across all partitions) to access the read only data in the global PDB.

DataSources

In accordance with an embodiment, each partition will have a data source that points to its PDB instance for writing tenant-specific data. When running in a partition in an application server, e.g., WLS, the name of the data source does not have to change for each partition. Instead, the application server isolates the data source in the JNDI tree on a per partition basis. These datasources can be defined in the resource group template, which will be referenced from the resource group for each tenant's partition.

Executing at Global Runtime and Partition

In accordance with an embodiment, applications or shared libraries that re deployed to the global runtime can be shared with all tenant-specific applications running in a partition. In addition to being shared across the partition, applications running in the global runtime can also execute in the context of a partition running in a specified tenant's context. However the reverse is not true; a tenant-specific application running in a partition cannot execute in the context of the global runtime. The table below shows which context switching is allowed:

| Source Scope of application | Target scope of application | Permit/Denied |
|---|---|---|
| Global runtime | Global runtime | Allowed |
| Global runtime | Partition | Allowed |
| Partition | Global runtime | Denied |
| Partition 1 | Partition 1 | Allowed |
| Partition 1 | Partition 2 | Denied |

Figure 19:
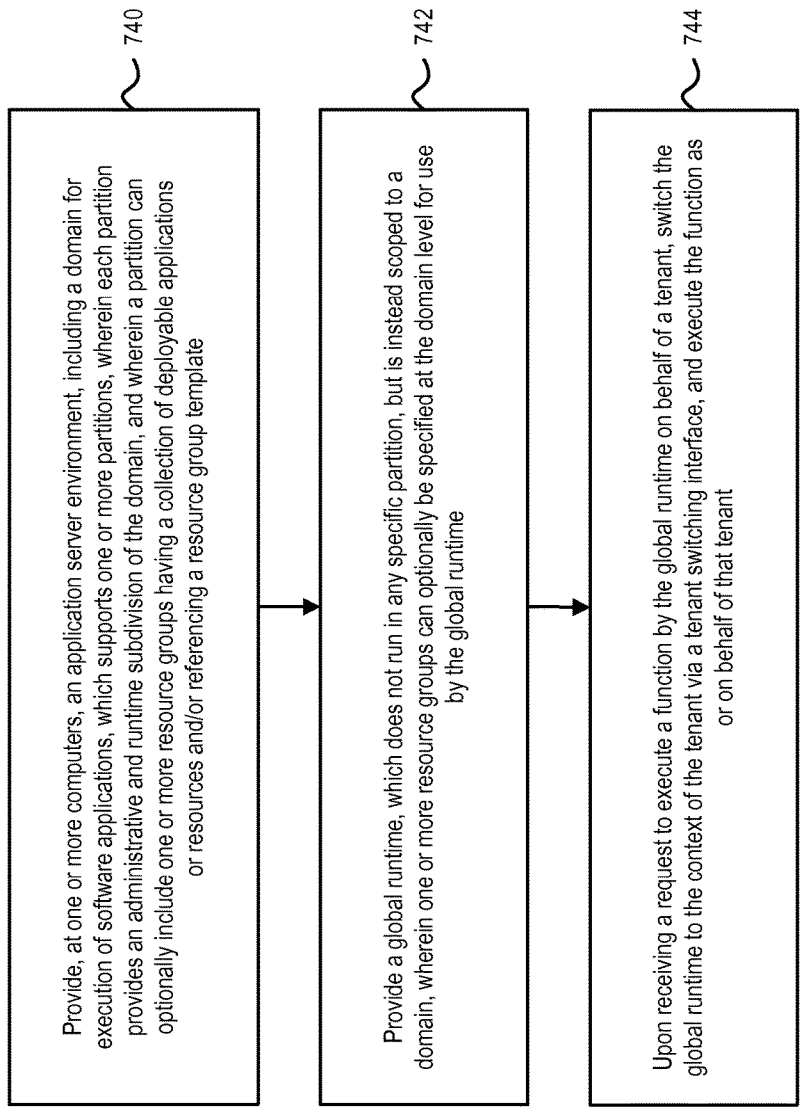
FIG. 19 illustrates a flowchart of method for supporting a global runtime in a multitenant application server environment, in accordance with an embodiment.

FIG. 19 illustrates a flowchart of method for supporting a global runtime in a multitenant application server environment, in accordance with an embodiment.

As illustrated in FIG. 19, at step 740, an application server environment is provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 742, a global runtime is provided, which does not run in any specific partition, but is instead scoped to a domain, wherein one or more resource groups can optionally be specified at the domain level for use by the global runtime.

At step 744, upon receiving a request to execute a function by the global runtime on behalf of a tenant, the global runtime can switch to the context of the tenant via a tenant switching interface, and execute the function as or on behalf of that tenant.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting a global runtime in a multi-tenant application server environment, comprising
one or more computers, comprising an application server environment executing thereon that enables deployment and execution of software applications, wherein the application server environment includes
a domain configuration that defines an application server domain for execution of the software applications, and one or more partitions of the domain;
a plurality of deployable resources that can be used within the application server environment; and
one or more resource groups that enable partition-specific information for one or more of the deployable resources;
wherein each partition of the one or more partitions, is associated with a partition configuration and provides a subdivision of the domain, includes one or more of the resource groups, and can be associated with a tenant; and
a global runtime that is scoped to the application server domain, wherein one or more resource groups can be specified at the domain level for use in the global runtime, including that the global runtime performs operations at a tenant switching interface that determines access by the global runtime to switch a thread context temporarily from a global context to a tenant context associated with a particular tenant, and to execute an operation at an application associated with a particular partition on behalf of the tenant.

2. The system of claim 1, wherein one or more resources in a resource group are targeted to all targets specified for the resource group, and whereupon the resource group being targeted to a cluster of managed servers, any applications included within the resource group are run on all of the managed servers in the cluster.

3. The system of claim 1, further comprising, for each tenant of a plurality of tenants, a tenant context associated with the tenant that can be mapped to a partition context for use with the tenant.

4. The system of claim 1, further comprising one or more resource group templates that enable information to be associated with a referenced resource group template, to indicate partition-specific information for one or more of the deployable resources.

5. The system of claim 1, wherein the tenant switching interface enables switching from a global level context to the tenant context associated with the particular tenant, to execute the operation on behalf of the particular partition.

6. The system of claim 1, wherein each component of the one or more components is associated with a plugin that provides an interface that enables lifecycle operations to be performed with that component.

7. The system of claim 1, whereupon a request being received at the application server environment that is directed to the particular partition, an invocation context object is created to represent the invocation, wherein the invocation context object includes an indication of the particular partition associated with the request.

8. The system of claim 7, wherein the global runtime includes one or more applications that run at the domain level to configure tenant-specific applications running a plurality of partitions of the domain, including that, for each partition of the plurality of partitions, the global runtime performs operations at the tenant switching interface to execute in the context of that each partition and its associated tenant context.

9. The system of claim 8, wherein the global runtime is initialized before initialization of the plurality of partitions, including that resource groups defined in the global runtime are started before resource groups defined in the plurality of partitions.

10. A method for supporting a global runtime in a multi-tenant application server environment, comprising:
providing, at one or more computers, an application server environment executing thereon that enables deployment and execution of software applications, wherein the application server environment includes
a domain configuration that defines an application server domain for execution of the software applications, and one or more partitions of the domain;
a plurality of deployable resources that can be used within the application server environment; and
one or more resource groups that enable partition-specific information for one or more of the deployable resources;
wherein each partition of the one or more partitions, is associated with a partition configuration and provides a subdivision of the domain, includes one or more of the resource groups, and can be associated with a tenant; and
providing a global runtime that is scoped to the application server domain, wherein one or more resource groups can be specified at the domain level for use in the global runtime, including that the global runtime performs operations at a tenant switching interface that determines access by the global runtime to switch a thread context temporarily from a global context to a tenant context associated with a particular tenant, and to execute an operation at an application associated with a particular partition on behalf of the tenant.

11. The method of claim 10, wherein one or more resources in a resource group are targeted to all targets specified for the resource group, and whereupon the resource group being targeted to a cluster of managed servers, any applications included within the resource group are run on all of the managed servers in the cluster.

12. The method of claim 10, further comprising, for each tenant of a plurality of tenants, providing a tenant context associated with the tenant that can be mapped to a partition context for use with the tenant.

13. The method of claim 10, further comprising providing one or more resource group templates that enable information to be associated with a referenced resource group template, to indicate partition-specific information for one or more of the deployable resources.

14. The method of claim 10, wherein the tenant switching interface enables switching from a global level context to the tenant context associated with the particular tenant, to execute the operation on behalf of the particular partition.

15. The method of claim 10, wherein each component of the one or more components is associated with a plugin that provides an interface that enables lifecycle operations to be performed with that component.

16. A non-transitory computer readable storage medium, including instructions stored thereon which when read and executed by one or more computers cause the one or more computers to perform the method comprising:

providing an application server environment that enables deployment and execution of software applications, wherein the application server environment includes
  a domain configuration that defines an application server domain for execution of the software applications, and one or more partitions of the domain;
  a plurality of deployable resources that can be used within the application server environment; and
  one or more resource groups that enable partition-specific information for one or more of the deployable resources;
  wherein each partition of the one or more partitions, is associated with a partition configuration and provides a subdivision of the domain, includes one or more of the resource groups, and can be associated with a tenant; and
providing a global runtime that is scoped to the application server domain, wherein one or more resource groups can be specified at the domain level for use in the global runtime, including that the global runtime performs operations at a tenant switching interface that determines access by the global runtime to switch a thread context temporarily from a global context to a tenant context associated with a particular tenant, and to execute an operation at an application associated with a particular partition on behalf of the tenant.

17. The non-transitory computer readable storage medium of claim 16, wherein one or more resources in a resource group are targeted to all targets specified for the resource group, and whereupon the resource group being targeted to a cluster of managed servers, any applications included within the resource group are run on all of the managed servers in the cluster.

18. The non-transitory computer readable storage medium of claim 16, further comprising, for each tenant of a plurality of tenants, providing a tenant context associated with the tenant that can be mapped to a partition context for use with the tenant.

19. The non-transitory computer readable storage medium of claim 16, further comprising providing one or more resource group templates that enable information to be associated with a referenced resource group template, to indicate partition-specific information for one or more of the deployable resources.

20. The non-transitory computer readable storage medium of claim 16, wherein the tenant switching interface enables switching from a global level context to the tenant context associated with the particular tenant, to execute the operation on behalf of the particular partition.

\* \* \* \* \*

UNITED STATES PATENT AND TRADEMARK OFFICE
CERTIFICATE OF CORRECTION

PATENT NO. : 10,382,537 B2
APPLICATION NO. : 14/864723
DATED : August 13, 2019
INVENTOR(S) : Mordani et al.

Page 1 of 1

It is certified that error appears in the above-identified patent and that said Letters Patent is hereby corrected as shown below:

In the Specification

In Column 23, Line 17, delete "with with" and insert -- with --, therefor.

In Column 37, Line 55, delete "( ex:wls)" and insert -- (ex:wls) --, therefor.

In Column 43, Lines 9-10, delete "lifecycle.serviceId" and insert -- lifecycle.serviceId. --, therefor.

In Column 52, Line 17, delete "tasks:" and insert -- tasks. --, therefor.

Signed and Sealed this
Fourth Day of August, 2020

Andrei Iancu
*Director of the United States Patent and Trademark Office*